March 11, 1941.　　　W. E. WOODARD　　　2,234,613
ENGINE VALVE GEAR
Filed Feb. 17, 1939　　22 Sheets-Sheet 1

INVENTOR
William E. Woodard.
BY
Synnestvedt & Lechner
ATTORNEYS

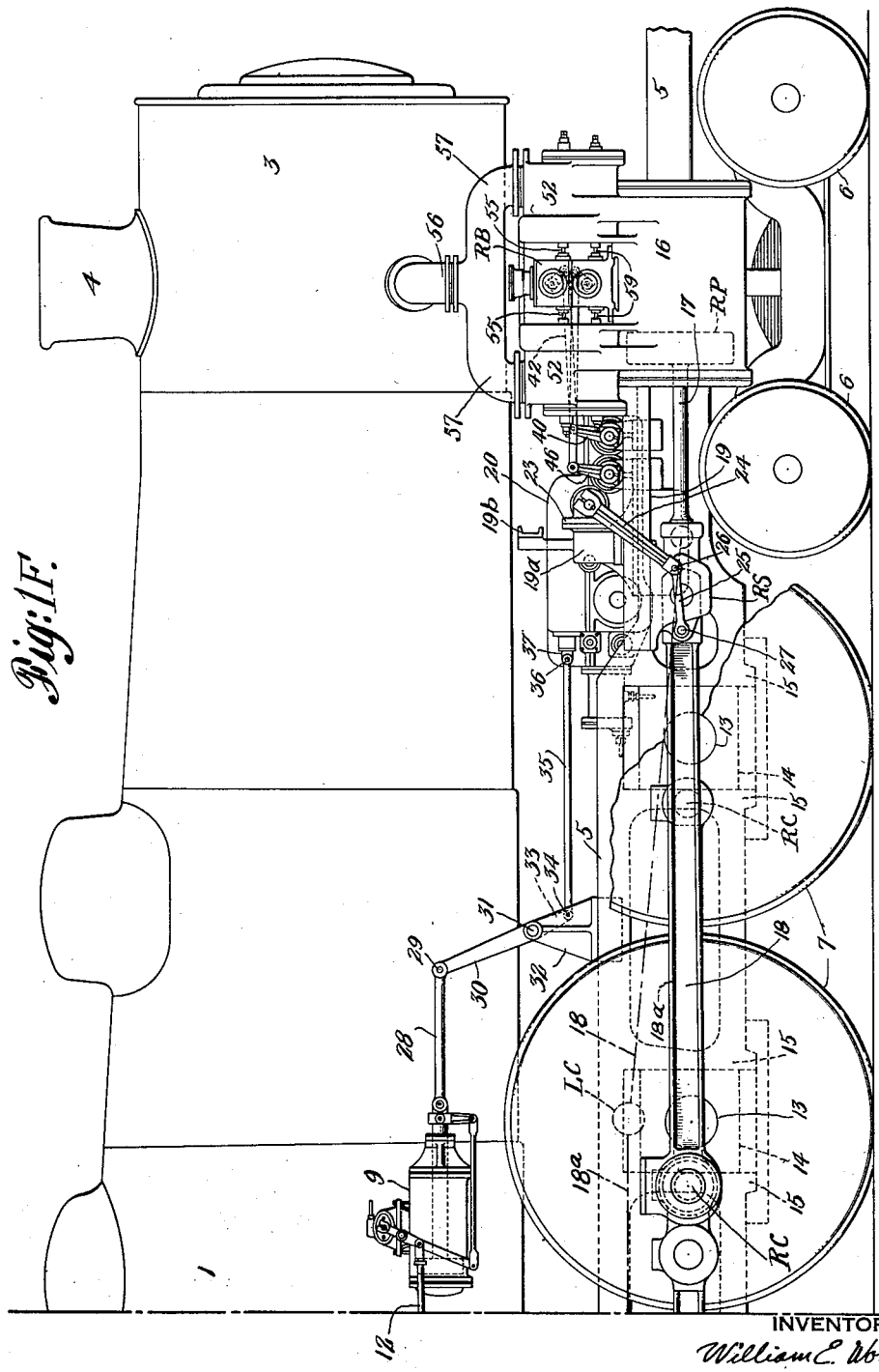

March 11, 1941.  W. E. WOODARD  2,234,613
ENGINE VALVE GEAR
Filed Feb. 17, 1939  22 Sheets-Sheet 3

INVENTOR
William E. Woodard
BY
Synnestvedt + Lechner
ATTORNEYS

March 11, 1941.   W. E. WOODARD   2,234,613
ENGINE VALVE GEAR
Filed Feb. 17, 1939   22 Sheets-Sheet 5

INVENTOR
William E. Woodard
BY
Synnestvedt + Lechner
ATTORNEYS

Fig. 6.

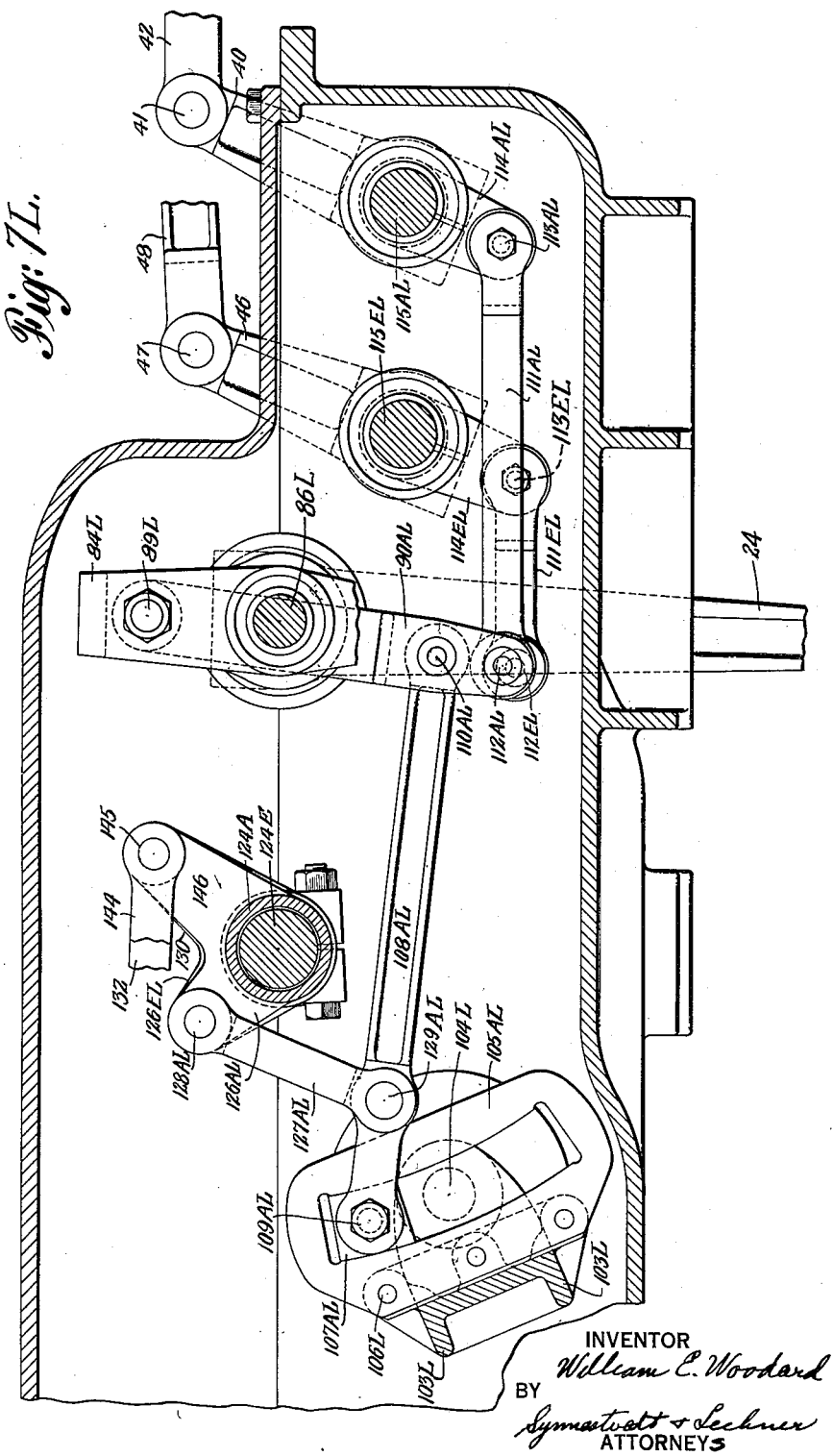

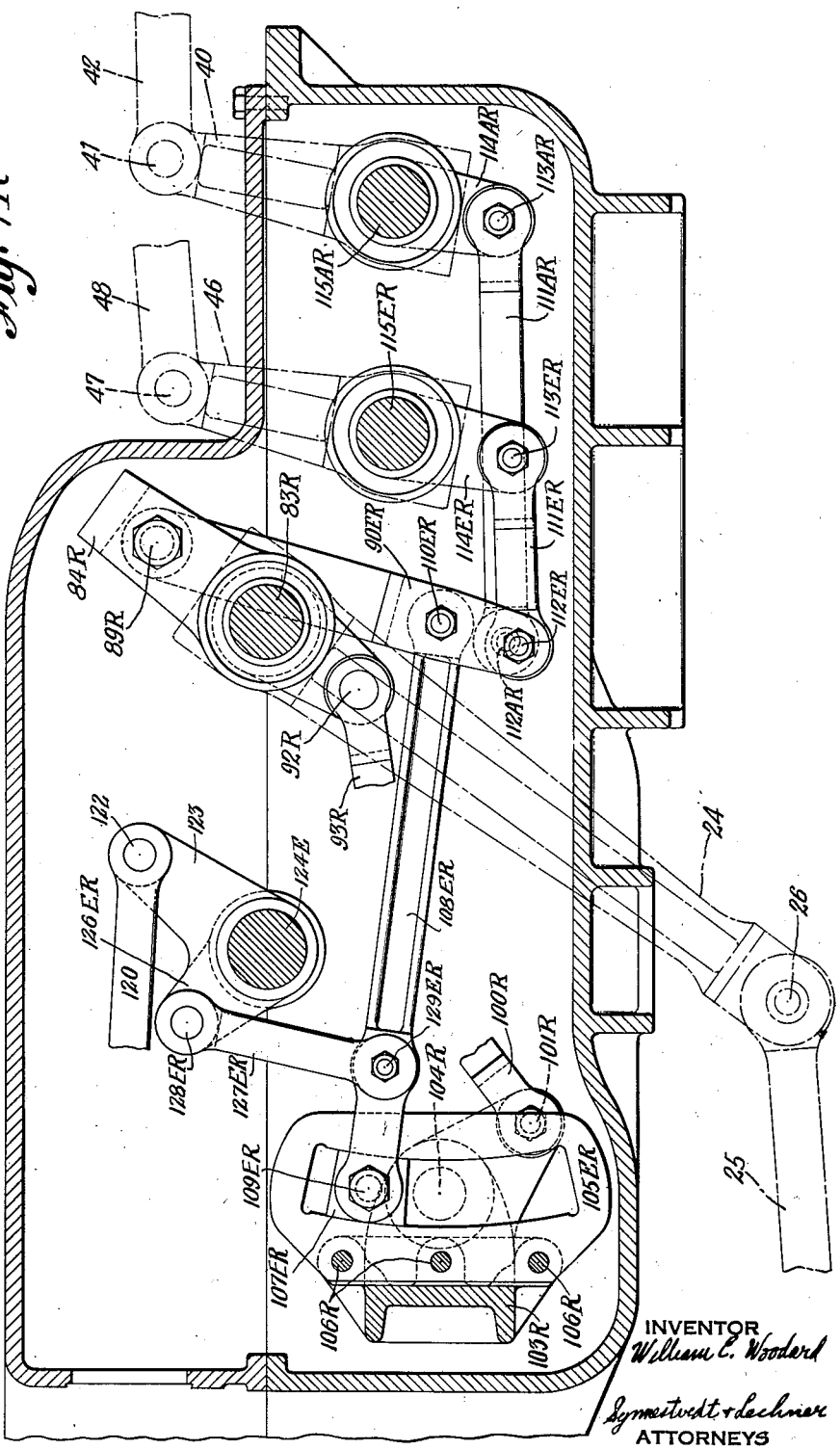

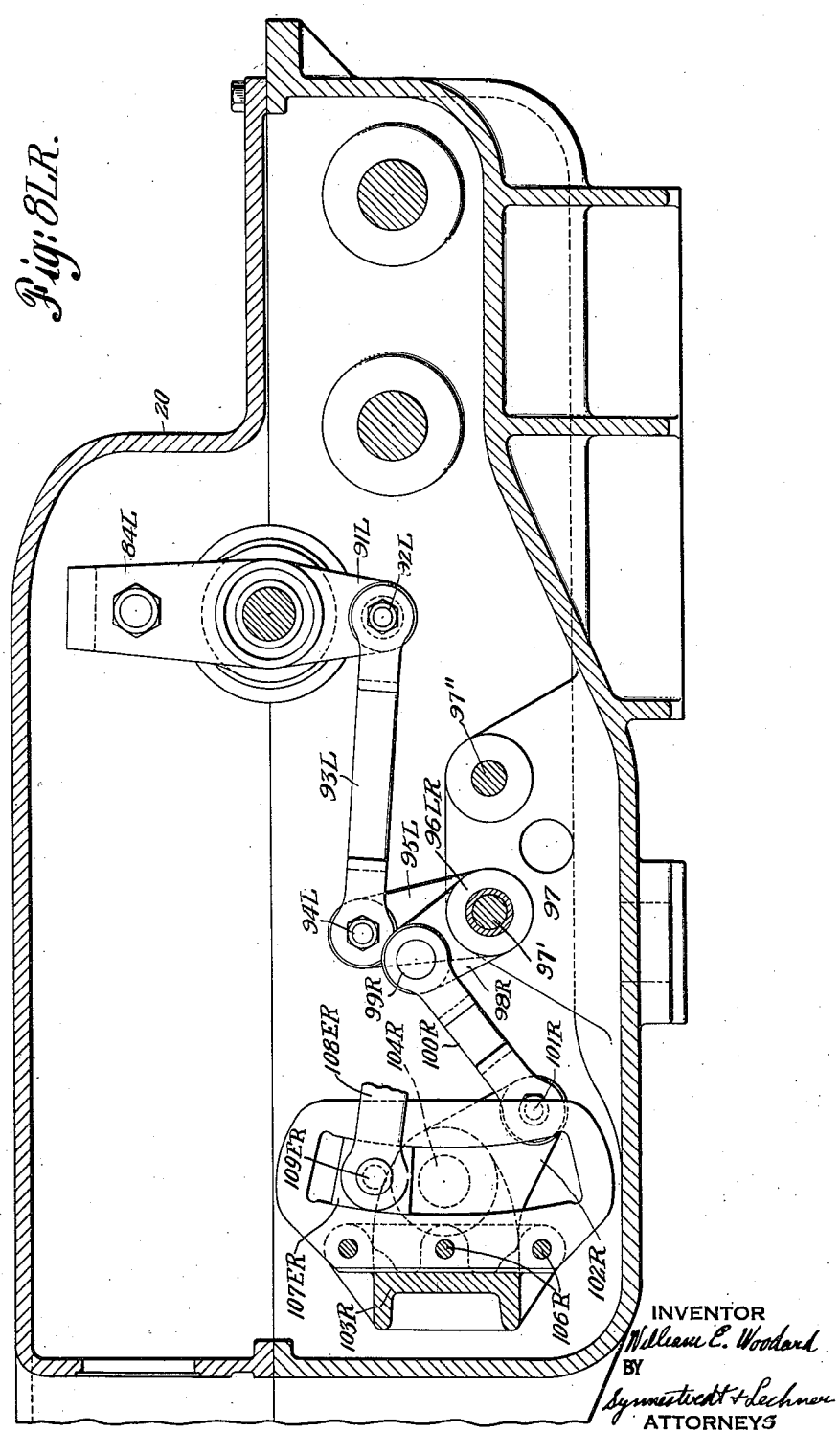

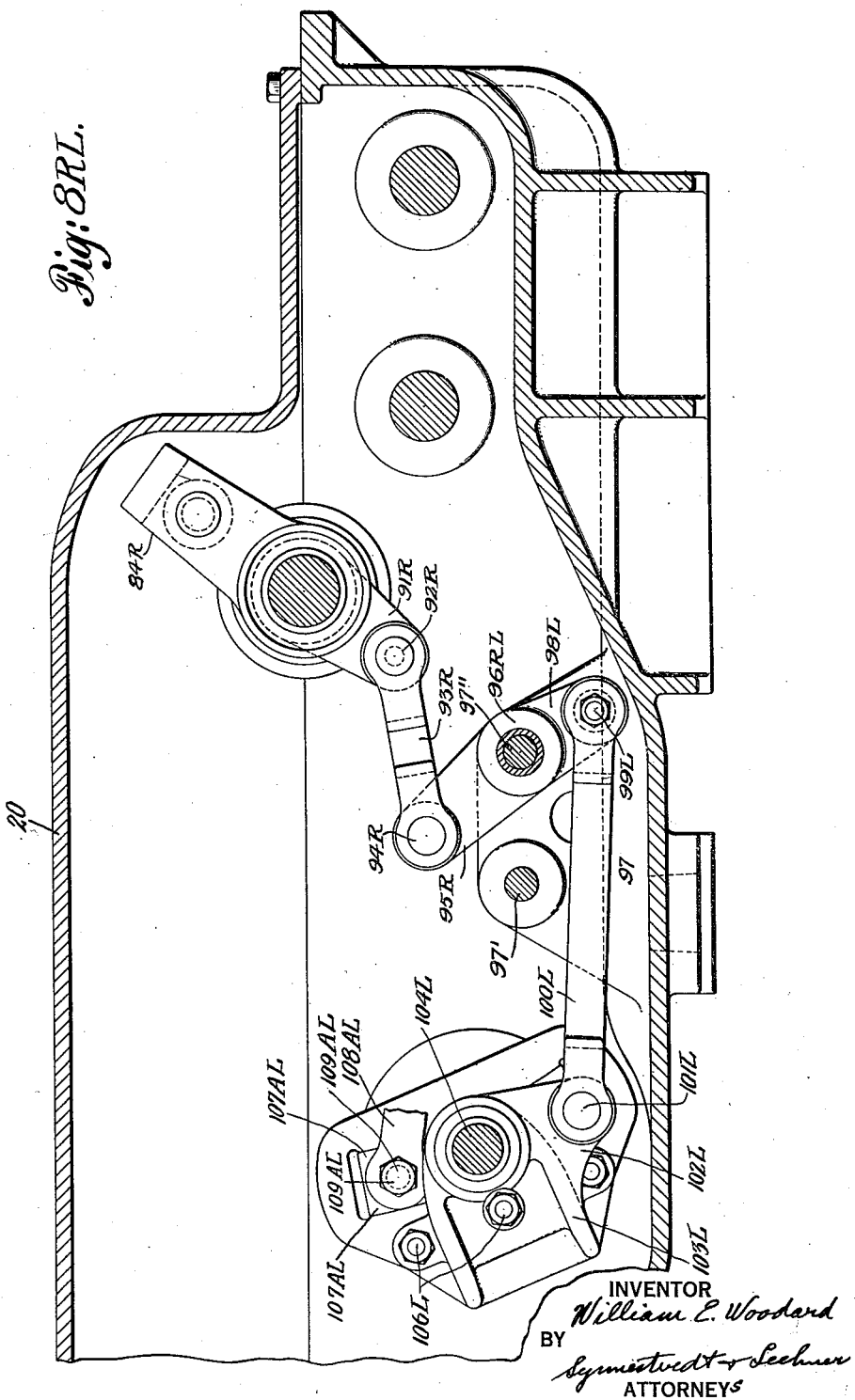

March 11, 1941.  W. E. WOODARD  2,234,613
ENGINE VALVE GEAR
Filed Feb. 17, 1939  22 Sheets-Sheet 12

INVENTOR
William E. Woodard
BY
Synnestvedt + Lechner
ATTORNEYS

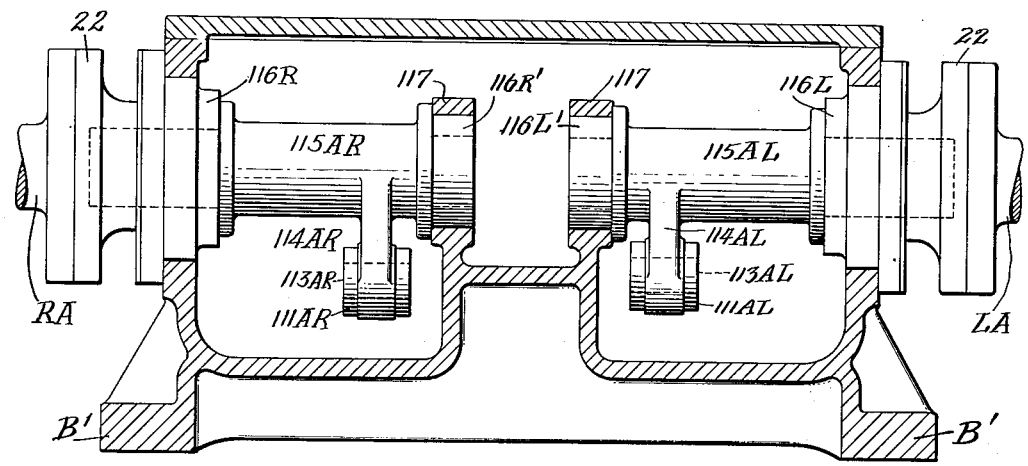
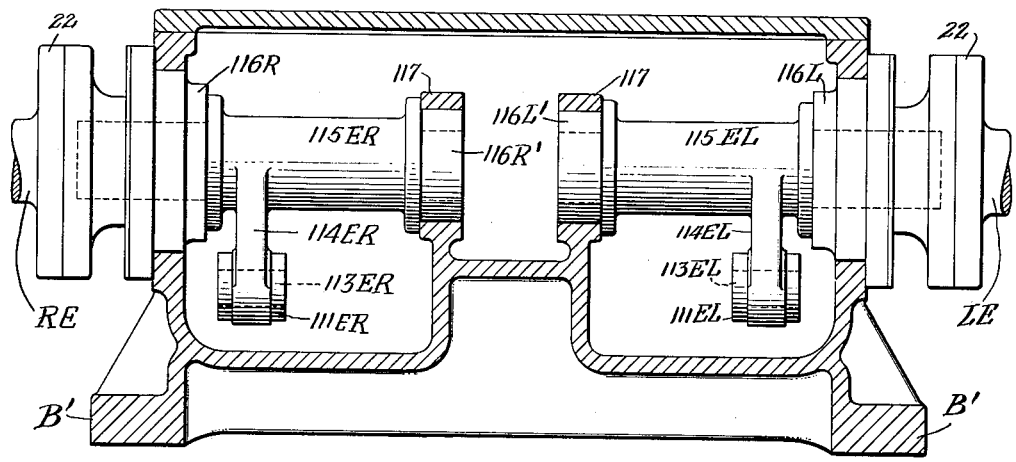

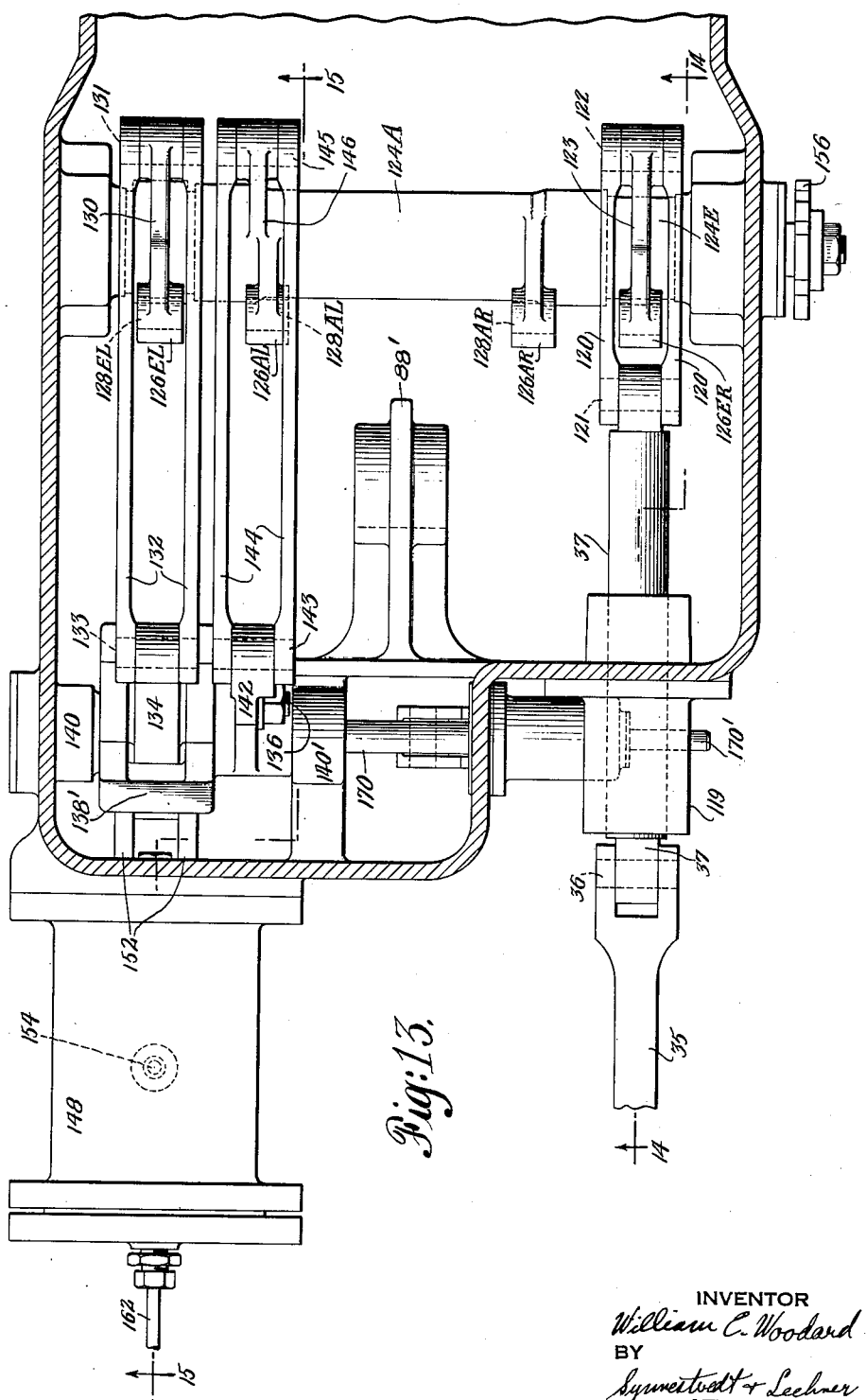

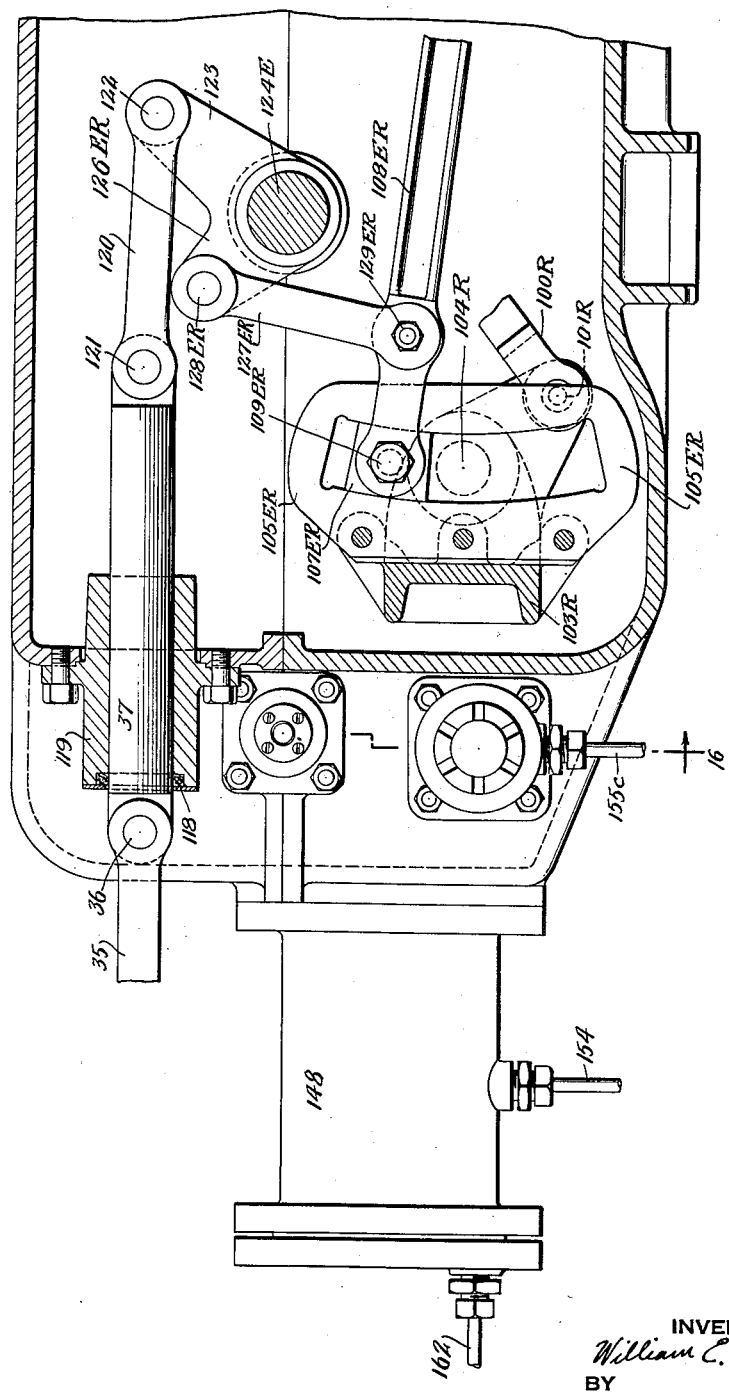

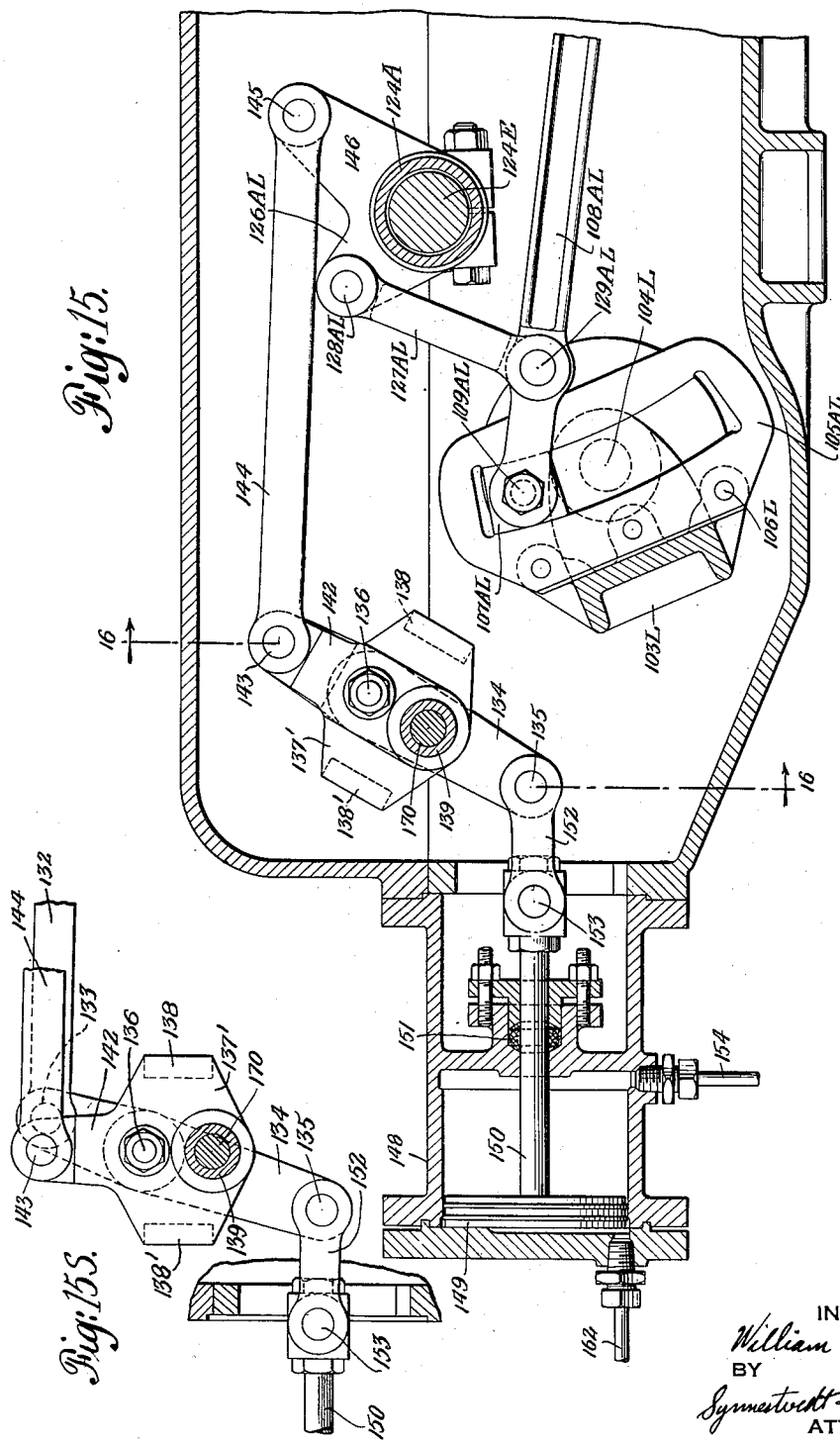

March 11, 1941.  W. E. WOODARD  2,234,613
ENGINE VALVE GEAR
Filed Feb. 17, 1939   22 Sheets-Sheet 17

INVENTOR
William E. Woodard
BY
Synnestvedt & Lechner
ATTORNEYS

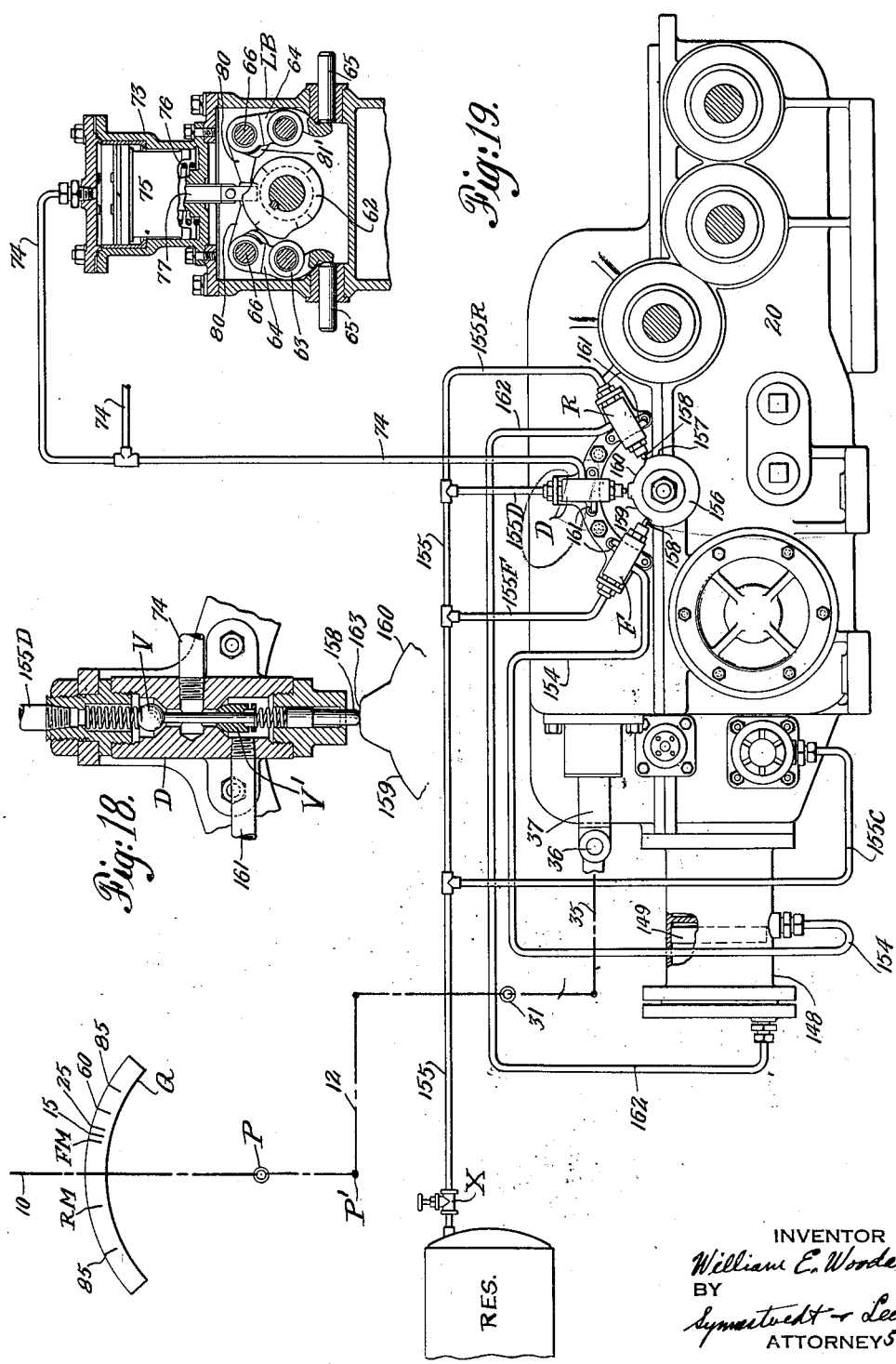

FULL FORWARD  85% CUT-OFF

60% CUT-OFF FORWARD

25% CUT-OFF FORWARD

FORWARD MID-GEAR

INVENTOR
William E. Woodard
BY
Synnestvedt & Lechner
ATTORNEYS

March 11, 1941. W. E. WOODARD 2,234,613
ENGINE VALVE GEAR
Filed Feb. 17, 1939 22 Sheets-Sheet 21

ADMISSION OVER-TRAVEL

CHANGE-OVER

INVENTOR
William E. Woodard
BY
Synnestvedt & Lechner
ATTORNEYS

March 11, 1941.  W. E. WOODARD  2,234,613
ENGINE VALVE GEAR
Filed Feb. 17, 1939    22 Sheets-Sheet 22
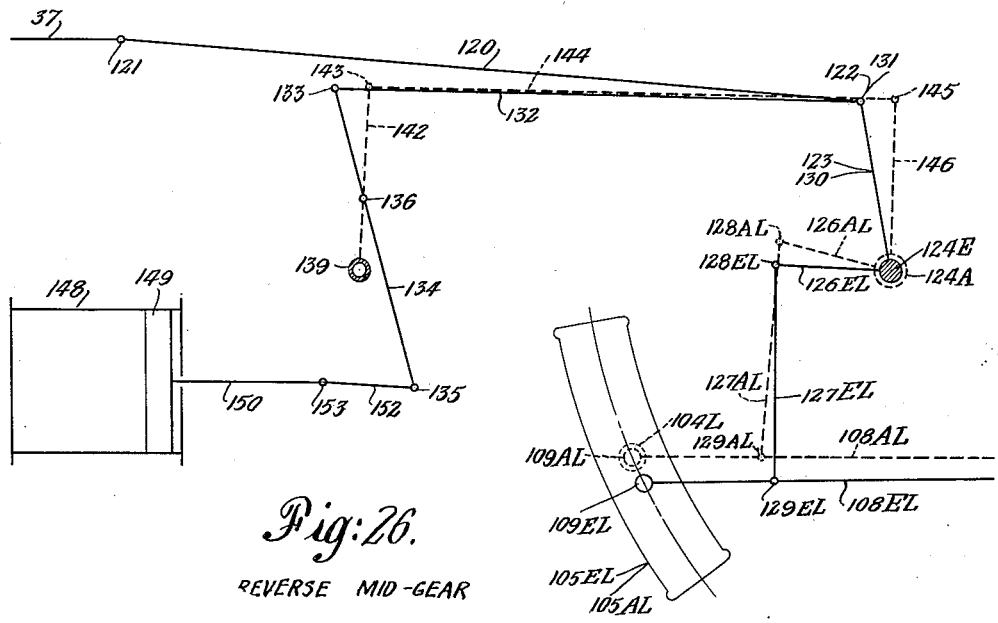
Fig:26.
REVERSE MID-GEAR
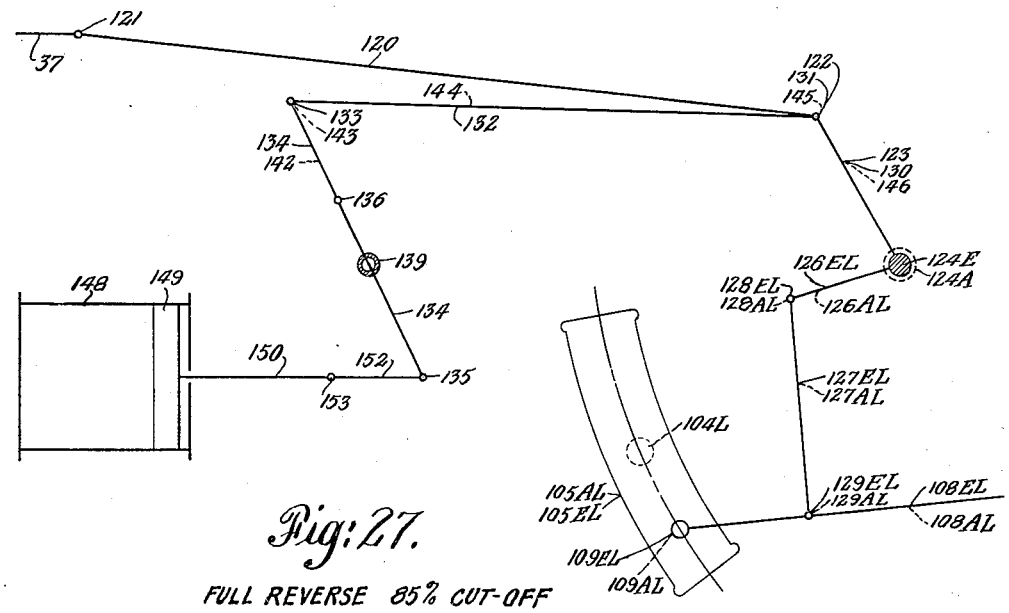
Fig:27.
FULL REVERSE 85% CUT-OFF
INVENTOR
William E Woodard
BY
Symmestvedt + Lechner
ATTORNEYS Patented Mar. 11, 1941

2,234,613

UNITED STATES PATENT OFFICE 2,234,613

ENGINE VALVE GEAR

William E. Woodard, Forest Hills, N. Y.

Application February 17, 1939, Serial No. 256,874

47 Claims. (Cl. 121—116)

Field of the invention

This invention relates to engine valve gear broadly, and more particularly to adjustable and reversible valve gear for actuating and controlling the valve means of locomotive engines.

General objects and advantages

One of the primary purposes of the invention is to secure an improvement in the variable timing of the valves of a fluid pressure engine, especially of the locomotive type, and particularly to obtain more nearly the ideal relationship of the several valve events with respect to the movements of the engine pistons, throughout the range of adjustment, with a view to increasing the power, speed, and efficiency of operation, and reducing the strains, vibrations and shocks upon the engine and the locomotive as a whole, particularly at high operating speeds.

Another important purpose of the invention is to provide a valve motion mechanism which from the standpoint of construction, maintenance, repair, weight, compactness, reliability, safety, and the like, is a substantial improvement over the prior art, even apart from the consideration of improvement in the timing of the valve events.

These general purposes of the invention, and the more specific objects and advantages which are associated therewith or which flow therefrom, will appear more clearly by contrast with the known practice in this art.

Briefly stated, it has heretofore been most usual in locomotive practice to control the valve events for each cylinder by means of a single valve member, which was actuated, through a lap-and-lead lever, by a combination of the motion derived from the associated piston and a motion derived from an eccentric crank on a wheel driven by said piston, the valve being actuated through a single take-off connection from the valve gear. Even where separate admission and exhaust valves were so driven, one take-off connection usually controlled all four valve events for each end of the cylinder, the four events being termed: admission (or "preadmission," as the steam admission is usually timed to occur slightly before the piston reaches the end of a piston stroke and is about to commence working in the opposite direction); cut-off (i. e., the point when the steam inlet passage is closed, measured in percentage of the piston stroke); release (the point at which the exhaust passage is opened, near the end of the stroke); and compression (the point near the end of the return stroke, when the exhaust passage is closed).

In normal running, as the speed of the locomotive increases, the engineman adjusts the valve gear to effect a substantially earlier cut-off so that the period from admission to the point of cut-off is shortened and the steam is used expansively for a greater portion of the piston stroke, and this adjustment customarily effects also a slightly earlier timing of the admission. It is desirable that the timing of the release and compression events be also advanced somewhat, as the point of cut-off is advanced, but with most of the common valve gears, designed to deliver only one actuating movement to effect all four functions, the release and compression events occur much earlier than they should, when operating at early cut-offs. In short, locomotive valve gears commonly in use inherently tie together all four of the valve events in such a way that the normal adjustments of cut-off produce detrimental alterations of the other events, notably release and compression, so that it has been necessary to set these events at a compromise relationship, not best suited either to high-speed or low-speed operation. Even this compromise relationship of the valve events has not usually been secured with accuracy, for even though the valve gear may be accurately laid out, kinematically considered, yet the usual structures are so large and heavy, and the amplitude of movement of their parts so great, that acceleration and other forces cause distortion, as does also the relative up-and-down and rolling motion between the locomotive engine and the unsprung parts of the running gear, since the valve gear is customarily connected both to the crossheads and to the driving wheels.

Attempts have been made to overcome such defects and limitations by means of valves driven by continuously-rotating shiftable cams of varying contour, or by arranging admission and exhaust valves in series, or by other expedients, but other structural and operational disadvantages have been thereby introduced, such as breakage of parts and complication of the mechanism; and accurate adjustment has been difficult if not impossible to secure.

The present invention is designed to overcome the foregoing and other difficulties and disadvantages.

Features of the invention

In effectuating the above-mentioned general purposes, the invention contemplates a valve gear having mechanism progressively adjustable to operatively utilize a predetermined range of amplitude of the motion derived from a moving part of the engine, for variably timing the admission valve means, and mechanism progressively adjustable to operatively utilize a predeterminedly limited portion only of the range of amplitude of the motion derived from such part, for variably timing the exhaust valve means, whereby the timing of the exhaust valve means as to release and compression events is kept within practical operating limits with relation to the timing of the admission valve means when adjusted for early cut-offs.

Still further, the invention contemplates the securing of a progressive differential adjustment of the admission and cut-off events on the one hand, and the release and compression events on the other hand, preferably throughout the range of cut-off adjustment, both in forward and reverse operation, and preferably also in a positively predetermined relationship as by means of coordinating mechanism actuated by a common controlling organ.

While these fundamentals of the invention may find embodiment in a variety of constructional forms of valve gear, which may be actuated in a variety of ways from the running gear of the locomotive, and may be applied to engines having various different numbers, arrangements and types of cylinders and valves, the invention is of especial advantage in locomotives of the two-cylinder, double-acting reciprocating piston type, employing separate admission and exhaust valve members, particularly of the poppet type actuable through oscillating cams; and the preferred embodiment of the valve gear of the present invention is actuated from and combines the motions of two driven parts which are out-of-phase, or moving in varying phase relationship, preferably the two crossheads which reciprocate in unison respectively with two pistons coupled to cranks arranged in quadrature, said crossheads (and thus the valve gear) being unaffected by relative motions between the sprung and unsprung parts of the locomotive, and the rotating parts of the running gear being relieved of the weight and forces usually imposed thereon by ordinary valve gears.

More specifically, the invention contemplates combining the plurality of motions actuating the valve gear, in such a way that the separate motions are combined in one ratio for controlling the admission and cut-off, and in a different ratio for controlling the release and compression, and making one of said ratios variable relative to the other, during the operation of the engine, and this without the necessity of employing shiftable cams and/or shiftable cam shafts.

It is a further object of the invention to secure a coordinated progressive differential adjustment of the admission and exhaust valve events as by means of a common adjusting and reversing member or lever, with or without the intermediation of a power reverse gear, in such manner that the component of one of the two actuating motions which are being combined for operating the valves is reduced more rapidly in the actuation of the admission valves than in the actuation of the exhaust valves as the cut-off is progressively adjusted to occur earlier with relation to the piston stroke.

In effecting this object, three ranges of adjustment of the valve gear are provided: first, a forward range or zone extending from forward full-gear position to a position which may be termed forward mid-gear; second, an intermediate range or zone extending from forward mid-gear position to reverse mid-gear position; and, finally, a reverse range or zone extending from reverse mid-gear position to reverse full-gear position. The range between forward mid-gear and reverse mid-gear is preferably a non-operating range so far as the working of steam in the cylinders is concerned and may thus be termed a "neutral" range, but this range is utilized to provide an interval within which the differentially adjusted relation of the admission and exhaust adjusting parts is inverted when moving the valve gear from the forward range into the reverse range, or vice versa.

While the foregoing feature may be secured in various ways, the invention contemplates more particularly the securing of this effect by differentially adjustable parts in the combining mechanisms for actuating the admission and exhaust valves, wherein the adjustment of such admission controlling parts proceeds more rapidly than the adjustment of the corresponding exhaust parts, when moving from forward full-gear position to forward mid-gear position (at which position the admission parts have reached the minimum possible cut-off adjustment), but that in moving from forward mid-gear position to reverse mid-gear position there is an inversion of the adjusted relation of the admission and exhaust parts; i. e., the exhaust parts are permitted to overtake the admission parts, so that when moving from reverse mid-gear position back to reverse full-gear position the differential relation existing between said parts corresponds to the relation in the forward range.

According to a further feature of the invention, mechanism is provided for opening one or more of the valves to effect free communication between the two ends of the cylinder when the locomotive is "drifting," and for coordinating this mechanism with the valve gear in a way to effect automatic opening of such valves upon movement of the valve gear into the neutral range, or into the middle portion of said range.

Still further, the invention contemplates, with a valve gear having an extended neutral range, a reverse lever connected to the valve gear in such manner that a corresponding intermediate or neutral range of movement of said lever is provided, whereby the likelihood of the engineman accidentally moving the reverse lever from the forward range into the reverse range, or vice versa, is eliminated; and whereby also the said lever controls the automatic opening of the valves for drifting.

More specifically, the invention contemplates the provision of a compact, preferably centralized, valve motion mechanism, arranged as a unit, for operating the admission and exhaust valve means of all cylinders, and incorporating means for differential adjustment of the admission and exhaust events, as by means of separate take-off connections to drive relatively movable (e. g. separate) admission and exhaust valves; and further wherein (as applied to a two-cylinder locomotive) there is provided for the valves of each cylinder separately-acting admission and exhaust combining levers connected to the relatively movable admission and exhaust valves, which levers commonly take a motion from the crosshead of the piston on the respective side (as by means of a single rockshaft and appropriate levers), but separately receive (as by means of differentially adjustable radius rods)

motions from an arcuate swinging link mechanism which is driven by a suitable series of connections from the crosshead at the opposite side, and wherein the differential adjustments of the admission and exhaust radius rods for both sides are preferably effected through a common coordinating mechanism actuated from a single manually operated member in the cab.

Still more specifically, the invention contemplates securing the said differential adjustment effect by a coordinating mechanism, whereby movement of the engineman's reverse lever or the like from full forward-gear position toward the neutral zone moves the admission radius rod link blocks, or equivalent parts, toward the center of oscillation of the link mechanism more rapidly than the corresponding exhaust valve operating parts, so that as the admission radius rod link blocks approach the center of oscillation of the link mechanism, the corresponding exhaust parts are lagging behind, but that when the latter parts reach a predetermined point in the neutral range the admission link blocks have over-travelled, whereupon an inverter (which may be termed a "conditioning" device) shifts the admission link blocks back past the center of oscillation of the link mechanism to the opposite differential position; and thereafter movement of the reversing lever into the reverse range again effects a differential adjustment of the admission and exhaust link blocks, until, when the full-gear reverse position is reached, both the admission and the exhaust parts are in their extreme reverse position, side-by-side in the link mechanism.

Specifically, the change-over of the admission radius rods in the link mechanism, during the transition from the forward mid-gear position to the reverse mid-gear position, or vice versa, is preferably effected by a shiftable lever mechanism, controlled automatically by means of an air-actuated piston, the air supply to which is delivered or cut off by means of valves actuated by a suitable cam or the like on a member moving with the reverse lever, such as an element of the reverse shafting associated with the valve motion mechanism. Similarly, the same or an associated cam is preferably employed to operate a valve, when the reverse lever is in its neutral range or zone, to actuate the drifting mechanism by means of air pressure, preferably drawn from the same source of supply.

According to a further feature of the invention, a safeguard or automatic cut-out is provided, which, upon failure of air pressure for the two mechanisms just referred to, automatically moves, as by the pressure of a spring, to render ineffective the change-over device, whereby, upon any failure of the air pressure, the admission and exhaust radius rods are locked to move together, under which circumstances the differential effect between the adjustment of the admission and exhaust events is eliminated, and the valve gear gives a unified timing of the admission and exhaust events similar to that now commonly secured by ordinary valve gears.

The invention also contemplates novel and advantageous formation, arrangement, and coordination of the physical elements of the mechanism shown in the drawings and/or described in this specification.

How the foregoing objects and advantages are secured, together with such others as may be incident to the invention, will be evident from the following description, taken together with the accompanying drawings, wherein designations L and R refer to left and right, respectively.

Description of drawings

Figures 1B and 1F, showing the back and front ends, together constitute a somewhat diagrammatic side elevational view of a locomotive, illustrating the application thereto of the present preferred embodiment of my invention.

Figure 6 is a plan section through the valve gear box or housing of Figure 2, to a larger scale (omitting the narrow rear portion thereof), showing in top plan most of the internal working parts of the valve motion mechanism proper, and illustrating fragmentarily the rockshafts which are actuated by the crossheads and extend into the valve gear box to actuate the mechanism therein, and the actuated rockshafts which extend out of the gear box for connection to the linkages for driving the valve cam shafts.

Figure 7L is a vertical longitudinal section taken approximately on the line 7L of Figure 6; showing most of the valve gear parts directly associated with the operation of the valves for the left-hand cylinder, including the left-hand yoke which is driven from the left-hand crosshead, the left-hand combining lever mechanism pivotally mounted on said yoke, the left-hand swinging link mechanism, the radius rod mechanism adjustably coupling the combining lever mechanism to the link mechanism, and the take-off connections for operating the left-hand valves. This figure omits, for the sake of clarity, the cross-over connection by which the left-hand yoke is adapted to actuate the right-hand link mechanism, and the cross-over connection by which the left link mechanism receives its motion from the right-hand yoke which is oscillated by the right-hand crosshead.

Figure 7R is a section similar to Figure 7L but taken approximately on the line 7R of Figure 6 to illustrate the major parts of the valve motion directly associated with the operation of the valves for the right-hand cylinder. This view also omits, for the sake of clarity, the cross-over connections.

Figure 8LR is an irregular vertical section omitting many of the parts shown in Figures 7L and 7R, but showing the cross-over connection from the left-hand yoke to the right-hand link mechanism.

Figure 8RL is another irregular vertical section, omitting various parts, but illustrating the cross-over connection from the right-hand yoke to the left-hand link mechanism.

Figure 11 is a transverse section taken about on the line 11—11 of Figure 6 to illustrate the mounting of the exhaust take-off rockshafts, and the arms by which they are coupled to the exhaust combining levers.

Figure 12 is a transverse section taken about on the line 12—12 of Figure 6 to illustrate the mounting of the admission take-off rockshafts, and the arms by which they are coupled to the admission combining levers.

Figure 13 is a plan section through the rear portion of the valve gear box or housing, including the narrow part thereof which does not appear in Figure 6, and extending forwardly to a point slightly ahead of the plane of Figure 9, i. e. ahead of the reversing shafting; this figure being designed to illustrate the major parts of the mechanism for securing differential adjustment between the admission and exhaust radius rods, but for the sake of clarity omitting the swinging links and the radius rods coupled thereto.

Figure 14 is a vertical longitudinal section taken approximately on the line 14—14 of Figure 13, but including also a showing of the right-hand swinging link and radius rod mechanism.

Figure 15 is a similar view taken approximately on the line 15—15 of Figures 13 and 16, illustrating the left-hand swinging link and radius rod mechanism, and showing the shiftable piston and lever mechanism, constituting part of the "inverter" or change-over device for conditioning the adjusting mechanism for forward or reverse operation.

Figure 15S is a supplemental view of the change-over lever arrangement shown in Figure 15, illustrating the parts as they appear when the valve gear adjustment is approximately at forward mid-gear position (the position of diagrammatic Figure 23).

Figure 18 is a section showing a typical construction for the valves seen in Figure 17.

Figure 19 is a piping diagram, illustrating the fluid pressure connections for the drifting, conditioning, and safety cut-out, mechanisms, with the associated operating parts shown in an intermediate position of the neutral range.

Figure 26 is a similar diagram, showing the parts in reverse mid-gear position.

Figure 27 is a similar diagram, showing the parts in full-gear reverse position.

*Description of typical locomotive arrangement*

Figure 1B:
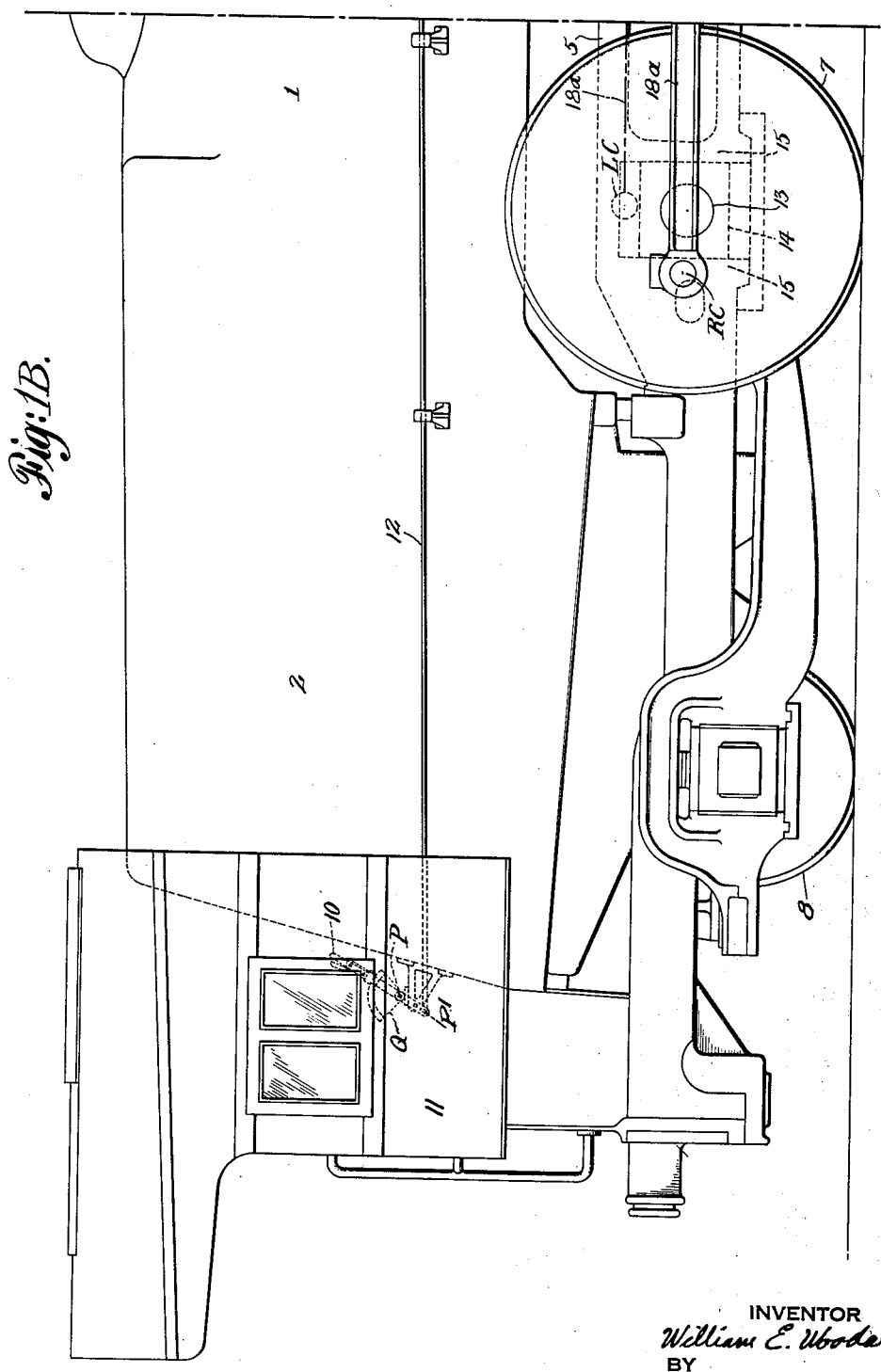

Figures 1F and 1B together illustrate a locomotive which, apart from the valve gear of the present invention, is of a well known "Pacific" type, comprising a boiler 1, fire-box 2, smoke-box 3, stack 4, main frame 5, front truck including wheels 6, three pairs of main drivers 7, trailer truck including wheels 8, power reverse gear 9, and reverse lever 10 mounted in cab 11 and having a reach rod 12 extending forwardly for connection to the power reverse gear 9 for actuating the same.

The driving wheels 7 are journalled by means of axles 13 in driving boxes 14 which receive weight from the main frame through springs (not shown) and are vertically slidable within the pedestal jaws 15. The locomotive shown is of the two-cylinder type, having a cylinder 16 at each side for actuating the pistons RP and LP, which are coupled respectively to the right and left cranks RC and LC, by means of piston rods 17, crossheads RS and LS, main rods 18 and side rods 18a.

The crossheads RS and LS reciprocate in crosshead guides 19, which are rigidly carried by the main frame 5, by means of brackets 19a and a transverse interbracing construction 19b.

It will be noted that in this particular instance the left crank is the leading crank. In other words, in forward motion of the locomotive, the left crank is 90° ahead of the right crank, although in many locomotives the opposite arrangement is employed. Thus, as seen in Figures 1F, 2 and 3, when the right crank RC has just passed rearward dead center (with the right-hand piston RP just commencing its forward stroke), the left crank LC has just passed its uppermost position, in the forward half of the cycle (and the left piston LP is at mid-stroke).

Figure 2:
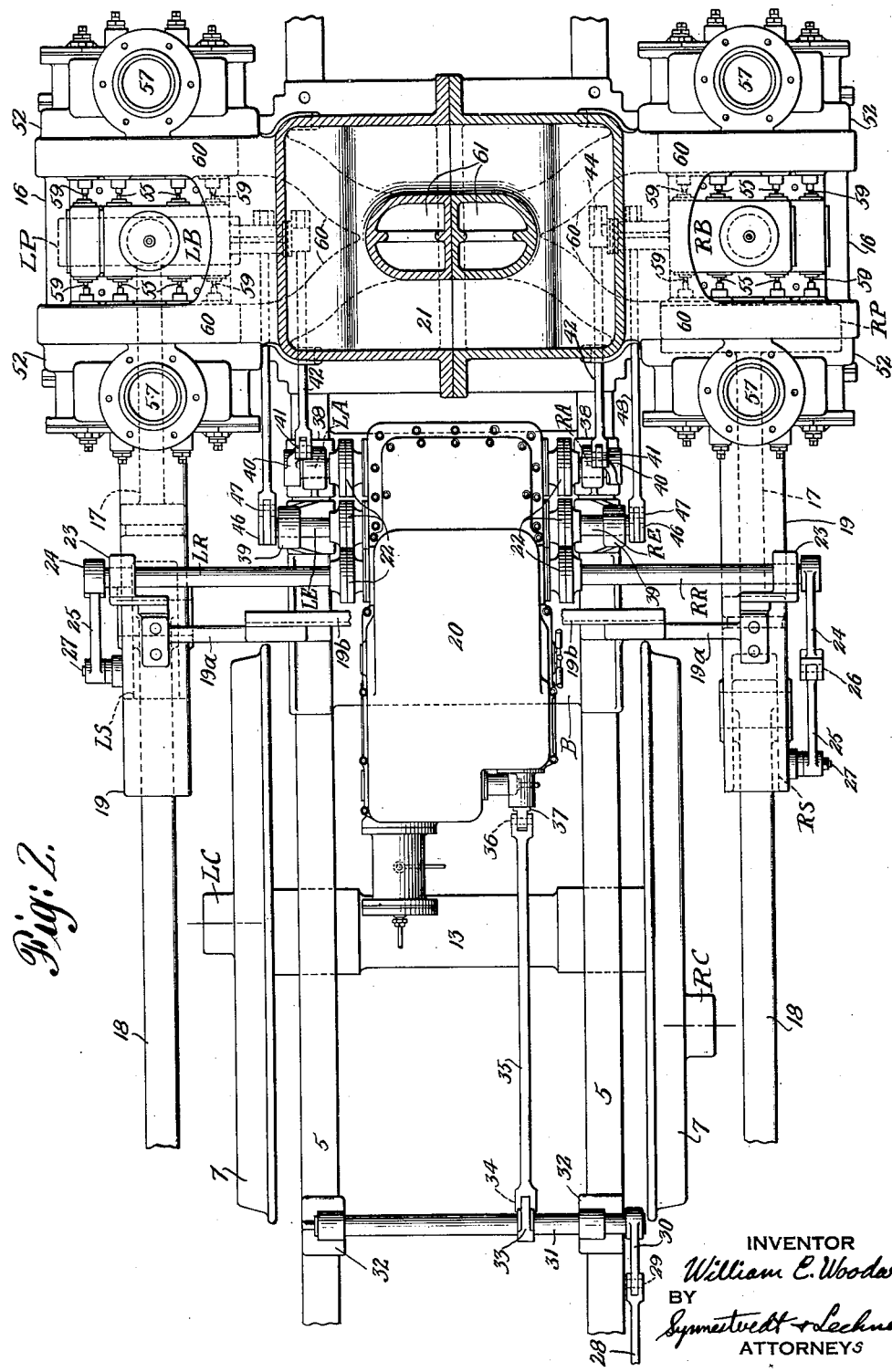
Figure 2 is a plan view, to a larger scale, of the forward portion of the locomotive chassis (taken in section through the saddle, and thus omitting the boiler, smoke-box and other parts of the superstructure), showing in top plan the housing or casing of the valve gear of the present invention, the connections leading thereto from the crossheads and from the power reverse gear, and the connections leading from said casing to the cam boxes associated with the cylinders and valve chests.
Figure 3:
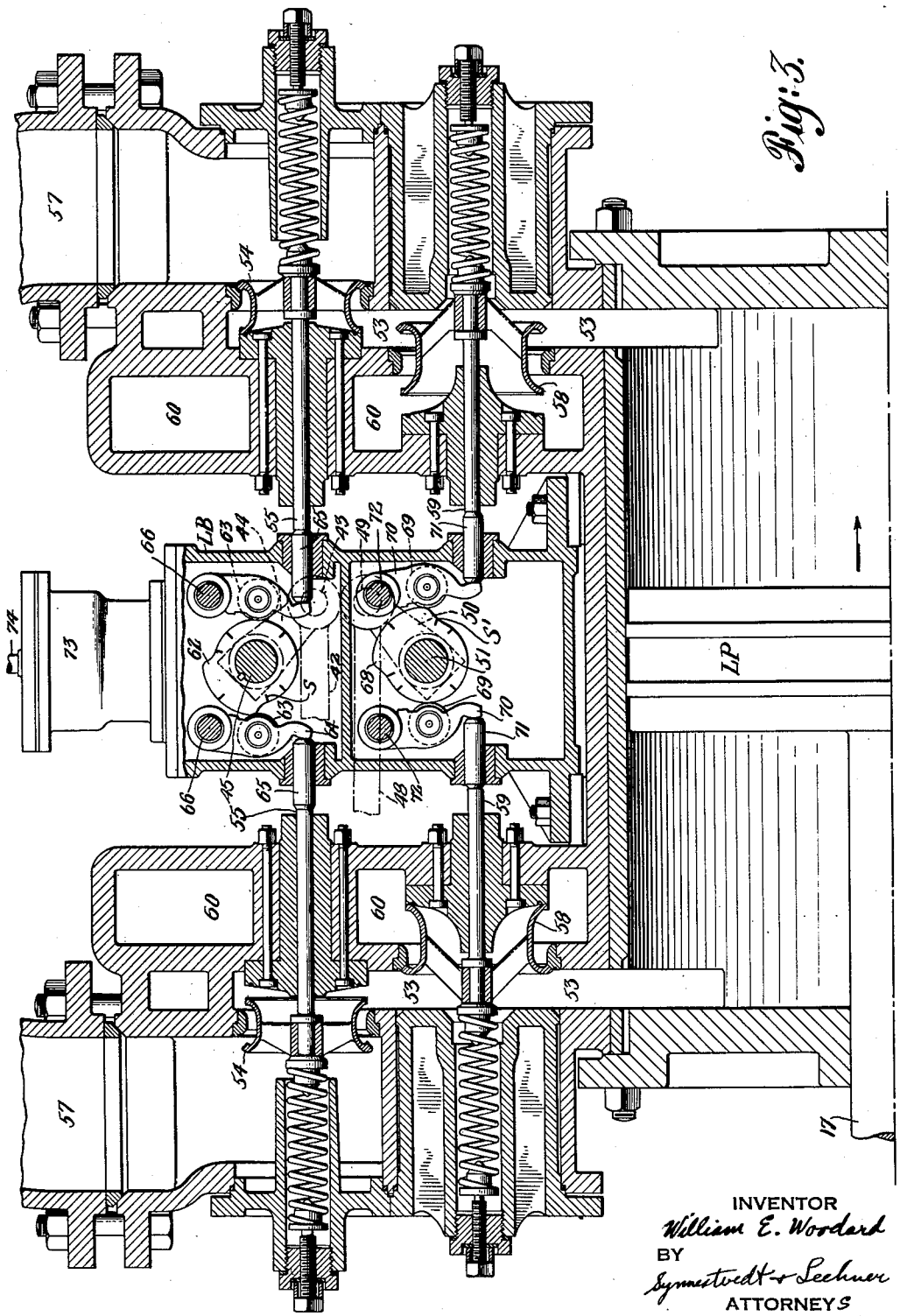
Figure 3 is a somewhat irregular vertical longitudinal section through the left-hand cylinder and the associated valve chests and cam box, to a larger scale than Figure 2. The general arrangement of these parts is similar to that shown in Figure 3 of my copending application Serial No. 186,139, filed January 21, 1938 (see my corresponding French Patent 849,182 of August 7, 1939), this figure being employed herein to show the piston, the valves, the valve cams, and the mode of coupling to the cam shafts the connections which come from the valve gear of the present invention.

The valve gear proper is desirably, but not essentially, housed or enclosed in a box or casing 20, which may conveniently be disposed (as shown in Figures 1F and 2) in a mid-region between the planes of the driving wheels, thus centrally between the longitudinal axes of the two cylinders, said box being herein shown in a position just behind the boiler saddle structure 21, where it may be supported on the main frame members 5 by any suitable rigid support, for instance such as shown in my United States Patent No. 2,136,405, issued November 15, 1938. Such a supporting base is shown at B in Figure 2, the valve gear box 20 having base brackets B' (seen in Figures 9 to 12) for mounting on said base.

Connections to the valve gear box

The actuating connections for driving the valve gear preferably take the form of a right-hand rockshaft RR and a left-hand rockshaft LR, which extend from adjacent the sides of the locomotive inwardly to said mid-region and there connect to parts of the mechanism passing through the side walls of the box 20, suitable disconnectible couplings 22 being provided adjacent said box, the outer ends of said rockshafts being journalled in supporting brackets 23 rigidly secured to the crosshead guide brackets 19a. The connection of the right and left rockshafts RR and LR to the respective crossheads RS and LS may each be constituted by an arm 24 fixed on the end of the rockshaft, and a link 25 pivoted to said arm at 26 and to the crosshead at 27.

The adjusting and reversing connection to the valve motion mechanism in the box 20 from the reverse lever 10 in the cab is as follows: lever 10 is pivoted at P to move over quadrant Q, the lower end of the lever being pivotally coupled at P' to the reach rod 12. The connection of reach rod 12 to the valve gear may be made a direct one, or, as shown in Figure 1F, it may be taken through a power reverse gear 9 of any suitable known type, by means of rod 28 pivoted at 29 to lever arm 30 fixed on a pivot shaft 31 which is journalled in brackets 32, thence by a second lever arm 33 pivoted at 34 to a rod 35 which is pivoted at 36 to the reversing rod 37 slidably extending through the back face of the box 20.

The actuating connections from the valve gear box to the right and left cam boxes RB and LB are preferably constituted by right-hand admission and exhaust valve actuating rockshafts RA and RE, and corresponding left-hand shafts LA and LE, which connect with parts extending out through the side walls of the box 20, having suitable disconnectible couplings 22, said shafts being journalled in suitable brackets 38 and 39. The admission actuating rockshafts RA and LA fixedly carry arms 40 which extend upwardly and are pivotally connected at 41 to the rear ends of rods 42, the forward ends of which are pivotally coupled at 43 to arms 44 fixed on the admission cam shafts 45, for actuating the admission valves, in a manner to be hereinafter described with reference to Figures 3, 4 and 5.

Similarly, the right and left exhaust actuating rockshafts RE and LE fixedly carry arms 46 which are pivoted at 47 to the rear ends of longitudinally extending rods 48, the forward ends of said rods being pivotally coupled at 49 to arms 50 fixed on the exhaust cam shafts 51.

Cam box mechanism

Figure 4:
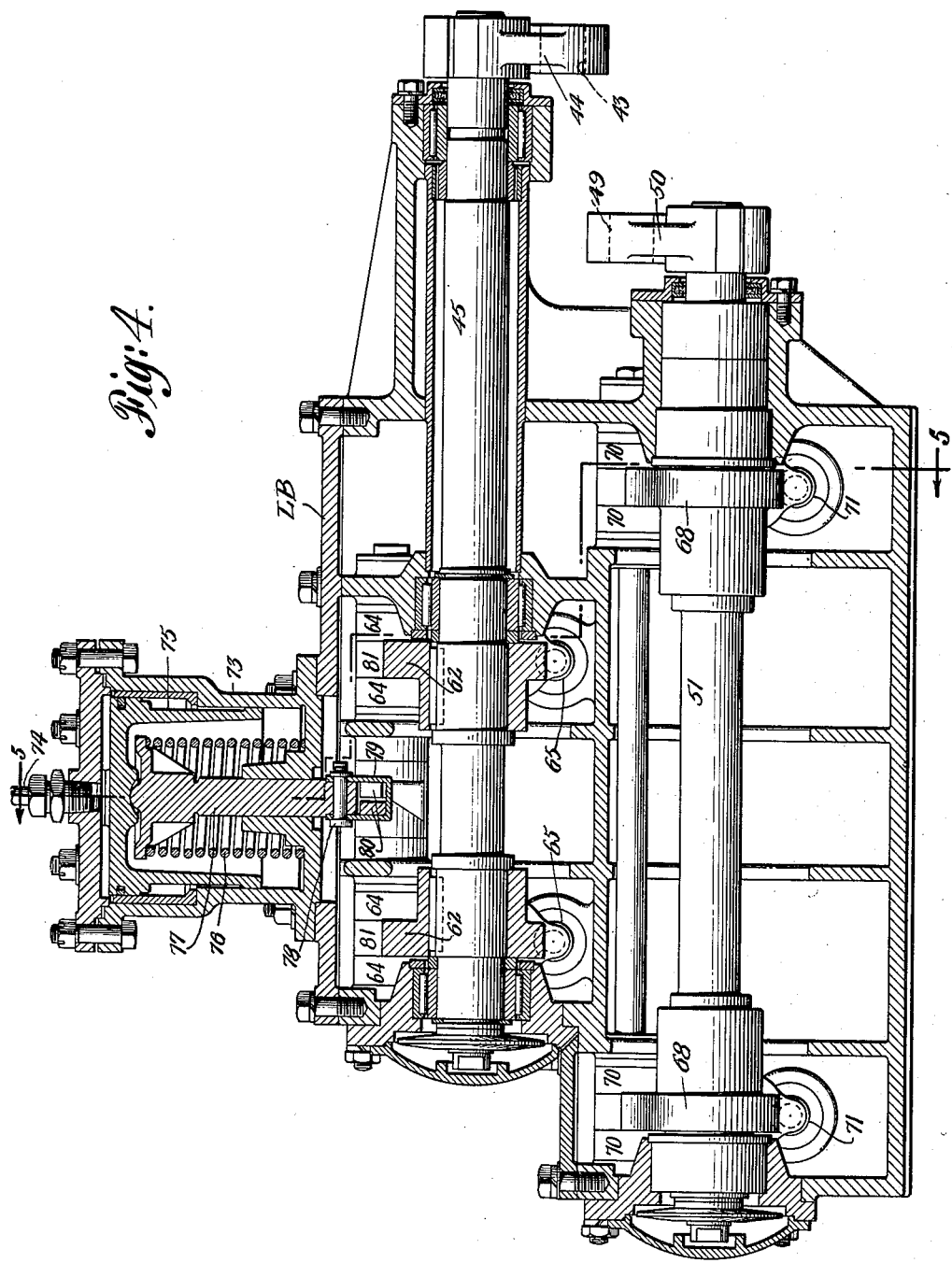
Figure 4 is a vertical section, to a still larger scale, taken transversely of the locomotive, through the cam box shown in Figure 3; this figure showing also the drifting arrangement, including fluid actuated piston, for holding the admission valves off their seats when the locomotive is drifting and the valve motion mechanism is in the neutral range.
Figure 5:
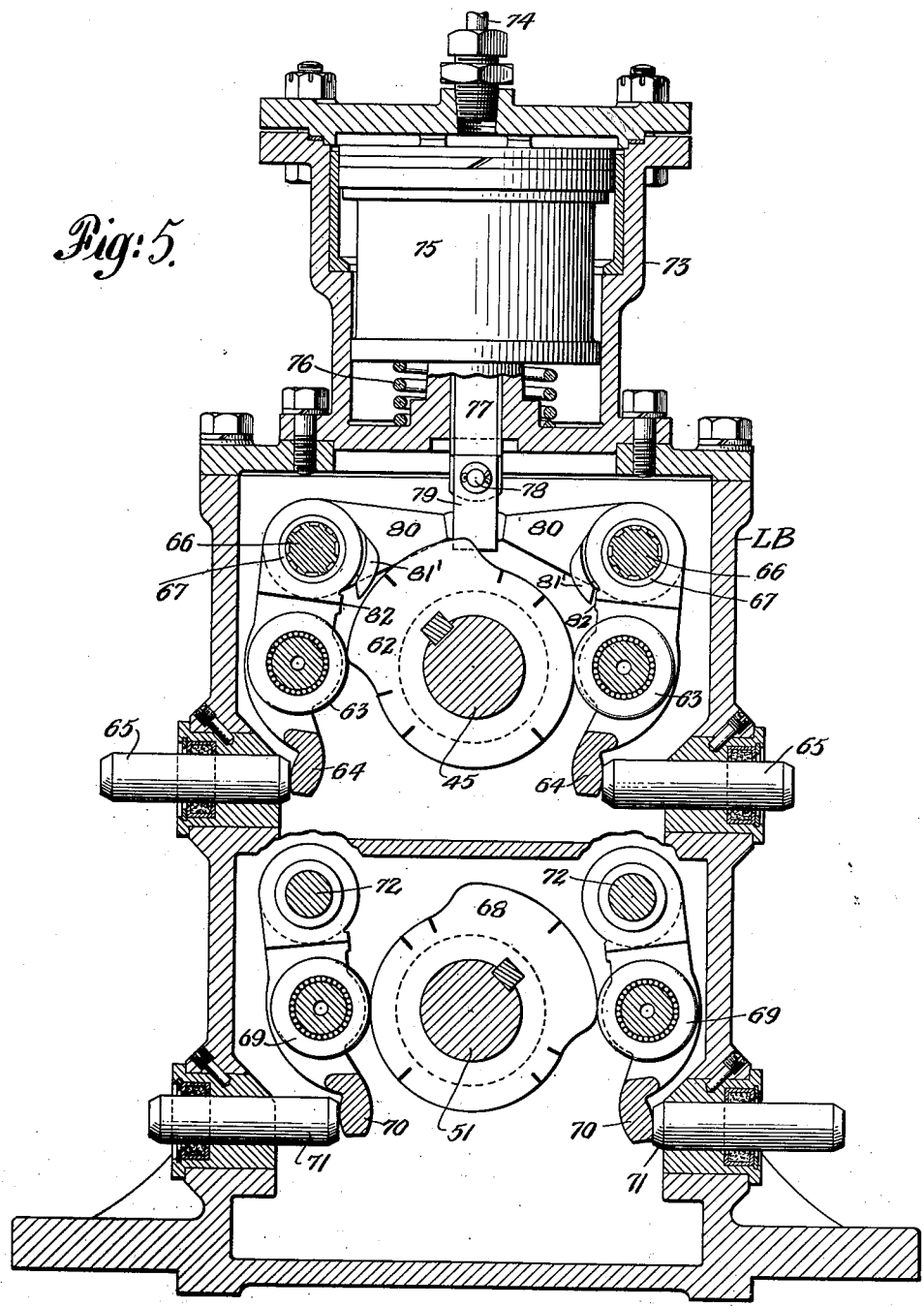
Figure 5 is an irregular section through the cam box shown in Figure 4, taken about on the line 5—5 of Figure 4, but to a still larger scale.

By reference particularly to Figures 3, 4 and 5, illustrating the cam box mechanism and its association with the valves and valve chests of the left-hand cylinder (which, of course, is duplicated for the right-hand cylinder), it will be observed that there is a valve chest 52 at each end of the cylinder (see also Figures 1F and 2) between which the cam box is located, said box being secured on top of the cylinder casting. In each chest is a port 53 communicating with the adjacent end of the cylinder.

Admission poppet valves 54 having stems 55 control the admission and cut-off of steam from the main steam pipe 56 through the branch pipes 57 to the respective ports 53.

Similarly, exhaust poppet valves 58 having stems 59 control the release and compression, i. e., the opening and closing of the ports 53 to the exhaust conduits 60, these conduits from the two end chests merging together (as seen in Figure 2) within the saddle casting 21, and the merging exhaust pipes from both cylinders meeting centrally at 61 just below the exhaust nozzle (not shown).

The longitudinal sectional view through the left cylinder (Figure 3) is so taken as to illustrate only one admission valve and one exhaust valve at each end of the cylinder, but as seen in Figure 2 these valves are arranged in pairs, there being at each end of the cylinder two side-by-side exhaust valves, and above them two side-by-side admission valves, which are adapted to be operated in parallel by the mechanism in the cam box.

The admission cam shaft 45 fixedly carries a pair of admission cams 62 (see particularly Figures 4 and 5), each in registry with a pair of cam followers 63 formed as rollers journalled on levers 64, and through the intermediation of these parts and the tappets 65 (each in registry with one of the admission valve stems 55), the admission valves are actuated by the cams 62; one cam 62 controlling two admission valves, one at each end of the cylinder, and the other cam 62 controlling the other two admission valves, one at each end of the cylinder. The levers 64 are freely pivoted on the shafts 66 through the intermediation of bushings 67.

Similarly, the exhaust cam shaft 51 carries a pair of exhaust cams 68, each of which is in registry with a pair of rollers 69, each roller being mounted on a lever 70, said levers engaging valve tappets 71, each of which registers with an exhaust valve stem 59; the levers 70 being pivoted on shafts 72. Since the exhaust valve operating cam shaft 51 is driven separately from the drive of the admission valve cam shaft 45, it is evident that they may be independently actuated from the novel valve motion mechanism in the valve gear box 20 in such manner as to secure a differential adjustability of the admission and exhaust valve events.

Before leaving the cam box construction, reference should be made to that portion of the drifting mechanism which is associated therewith. On top of the cam box is a cylinder 73 (see particularly Figures 4 and 5) having a fluid pressure connection 74 coupled thereto. A piston 75 in said cylinder is normally held in the raised position, shown, by means of a spring 76. The piston stem 77 extends downwardly into the cam box, and at its lower end is coupled by a pin 78 and a yoke 79 to the free ends of a pair of levers 80, which are respectively splined on the shafts 66. Also splined on each of said shafts 66, in positions between the bifurcated arms of levers 64, are collars 81 each carrying striking arms 81' which overhang but are normally out of engagement with the valve actuating levers 64.

Upon admission of fluid under pressure through the pipe 74 to the cylinder 73, the piston 75 is moved downwardly against the pressure of spring 76 (to the position shown in Figure 19), whereby the stem 77 swings the lever arms 80 downwardly, which through the medium of the shafts 66 swings the striker arms 81' outwardly against the shoulders 82 on the levers 64. This action moves said levers, and thus swings the rollers 63 out of the path of operation of the cam 62, and thereby effects an extreme outward thrust of the valve tappets 65, and thus a full opening of the admission valves 54, so that when the locomotive engine is drifting and the reverse lever is in a certain position as hereinafter described, free communication is established between the two ends of the cylinder, through the ports 53, admission valves 54 and steam pipes 57, whereby to prevent the building up of pressure or vacuum conditions in one end or the other of the cylinder when the locomotive is drifting. The control of fluid pressure to the cylinders 73 of the right and left cam boxes RB and LB will be described hereinafter, in association with description of the valve gear adjustment.

*Description of the valve gear proper*

The present preferred structural embodiment of the valve motion mechanism is illustrated in Figures 6 to 19 inclusive, and it should be noted that wherever feasible the reference characters designating the parts have the index letter R or L, for the right or left sides of the mechanism, respectively, and the characters A or E for the parts actuating the admission and exhaust valves, respectively. Insofar as practicable, the mechanism will be described with reference to those parts which operate the valves for the left-hand cylinder of the locomotive, the right-hand half of the mechanism being in most respects a counterpart.

Figure 6:
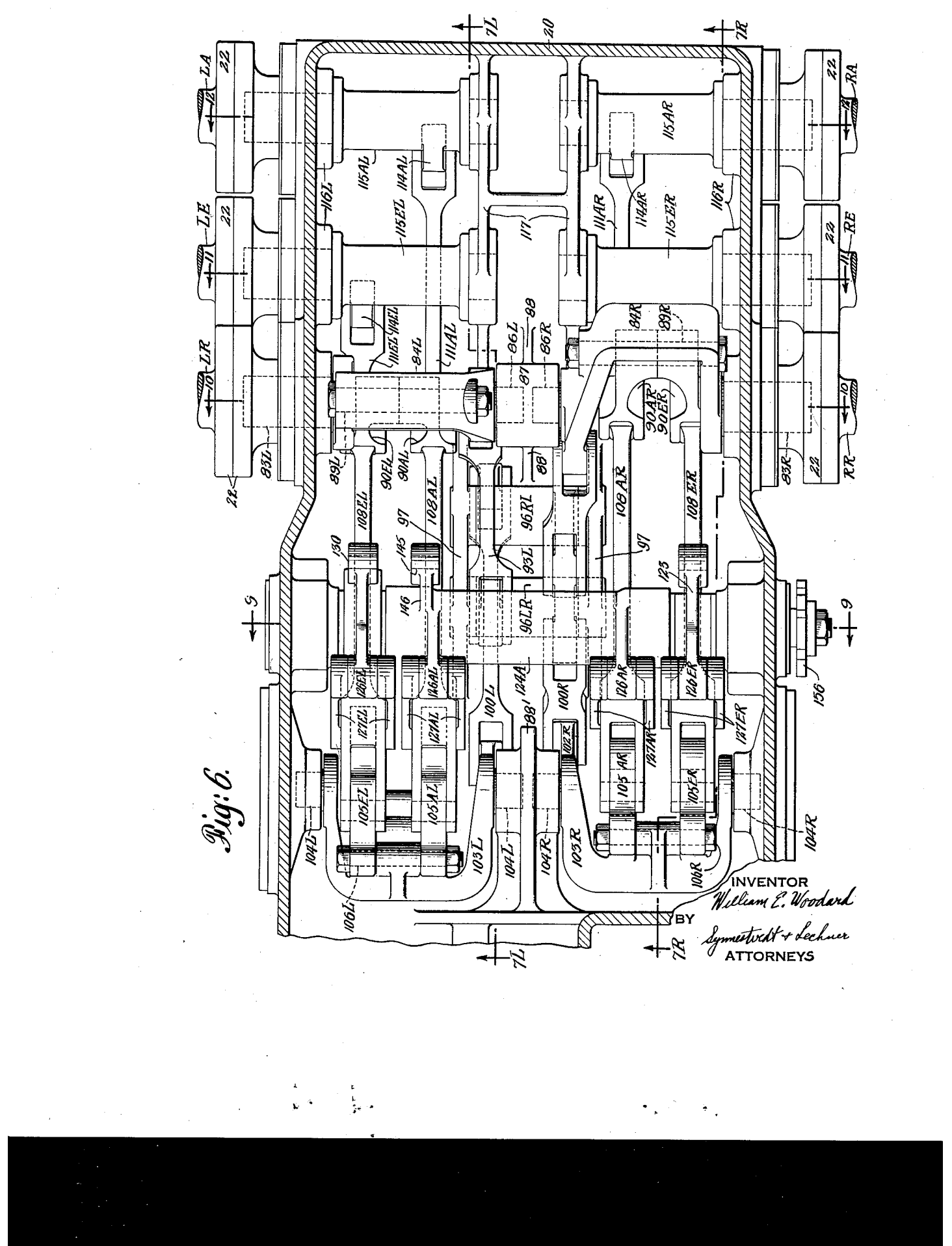
Figure 10:
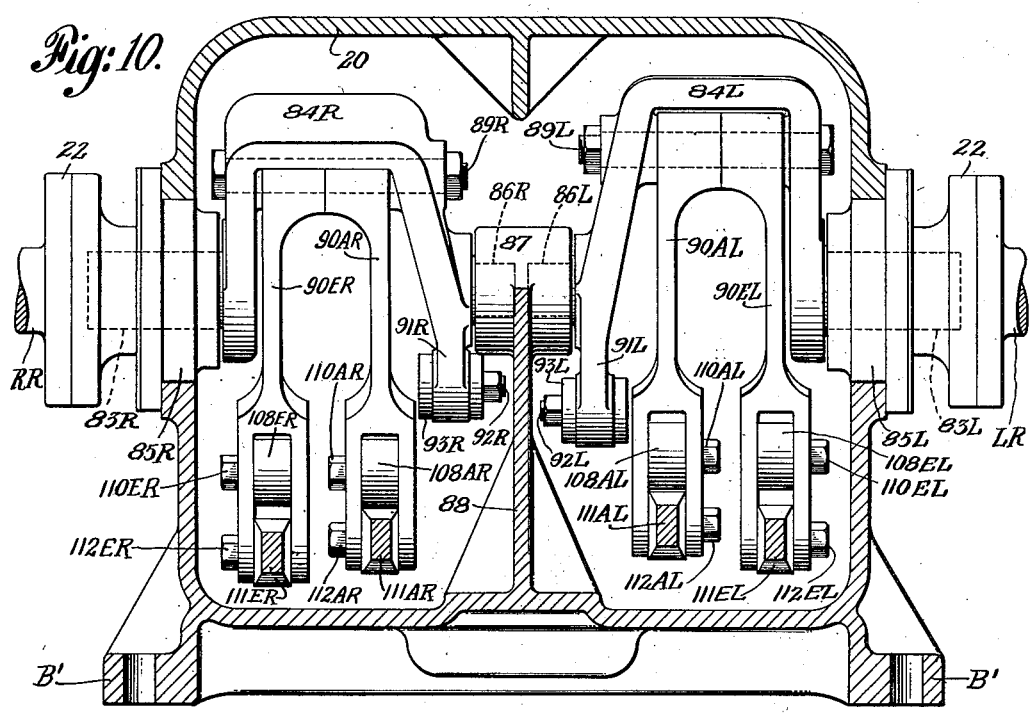
Figure 10 is a transverse section taken about on the line 10—10 of Figure 6, also omitting certain parts but showing the pairs of combining levers, one pair constituting the combining lever mechanism for the right side and the other pair the combining lever mechanism for the left side, and illustrating not only the independent pivoting of said levers on their associated yokes, but also the coupling of the pairs of radius rods to the levers, and (in section) the pairs of admission and exhaust take-off connections.

Referring now to Figures 6 and 10, it will be observed that the right and left actuating rockshafts RR and LR, oscillated by the crossheads RS and LS, are connected by couplings 22 each to a trunnion 83R, 83L, of the respective oscillatable yokes 84R, 84L, said trunnions being journalled in bearings 85R, 85L seated in the side walls of the box. Each transmission yoke or lever, 84R, 84L, has a second trunnion 86R and 86L, respectively, journalled in a central bearing 87 which is carried by an upstanding bracket 88 integral with the bottom of the box 20. Each transmission yoke is thus oscillated in synchronism with the crosshead and thus the piston which drives it, and in one sense the yoke may be considered as a part of the actuating connection from the crosshead to the valve gear proper.

*The cross-over connections*

The oscillating yoke 84L has the function of transmitting motion of the left-hand crosshead to the combining lever mechanism for the valves of the left-hand cylinder, and to this end it pivotally carries at 89L an admission combining lever 90AL and an exhaust combining lever 90EL (see also Figure 7L), the other connections to which will be described hereinafter.

The yoke member 84L has the further function of transmitting motion of the left-hand crosshead to the right-hand side of the mechanism, particularly to the swinging link mechanism thereof (as shown in Figures 6 and 8LR), and to this end it has a downwardly extending arm 91L, which has pivotally coupled thereto at 92L one end of a link 93L, the other end of which is pivoted at 94L to an arm 95L fixed on a short transverse hollow rockshaft 96LR, which is fulcrumed on a pin 97' mounted by brackets 97 carried in the bottom of the box. Rockshaft 96LR fixedly carries another arm 98R, which in turn is pivoted at 99R to one end of a link 100R, the other end of which is pivoted at 101R to an arm 102R (see also Figure 9) fixed on and extending downwardly from the bracket 103R of the right-hand link mechanism, which is thus oscillated on its trunnions 104R, in unison with the left-hand crosshead of the locomotive.

Similarly, the right-hand yoke member 84R has the function of transmitting motion of the right crosshead to the right-hand admission and exhaust combining levers 90AR and 90ER; and it has the further function of actuating the left-hand swinging link mechanism (as seen from Figures 6, 7L, 8RL, 9 and 10). Thus the yoke 84R carries a depending arm 91R, which is pivotally coupled at 92R to the forward end of a link 93R, the rear end of which is pivoted at 94R to an upstanding arm 95R fixed upon a short transverse hollow rockshaft 96RL mounted on a fulcrum pin 97". Said shaft crosses over to the left of the longitudinal central plane of the mechanism and there carries a second fixed arm 98L, which extends downwardly and is pivotally coupled at 99L to the forward end of a link 100L, the other end of which is pivoted at 101L to a downwardly extending arm 102L secured to the mounting bracket 103L of the left-hand link mechanism, whereby said link mechanism is oscillated on its trunnions 104L in unison with the right-hand crosshead of the locomotive engine. The construction and arrangement of the swinging link mechanism itself will be considered later.

By comparison of Figures 8LR and 8RL (showing the cross-over connections), it will be observed that the arm 98L extends downwardly, whereas the corresponding arm 98R extends upwardly, with the result that the cross-over connection shown in Figure 8LR transmits the motion of the left-hand yoke 84L to the right-hand link mechanism in such manner that the two oscillate in like sense, whereas the other cross-over connection shown in Figure 8RL effects a reversal of the motion transmitted from the right-hand yoke to the left-hand link mechanism, so that the latter oscillates in opposite sense to its actuating yoke.

With this arrangement, the link blocks (right and left) when located at like ends of the links operate the valves of both cylinders in harmony for a given direction of engine operation.

Additionally, it will be noted that the cross-over shafts and associated parts, are disposed one in back of the other, which provides adequate clearance of these two cross-over connections, within a very limited space.

*The link mechanism and combining levers*

Referring now to the link-and-radius rod-mechanism for the left side (as seen in Figures 6, 7L, 9 and 10), it will be seen that there are separate admission and exhaust links 105AL and 105EL, mounted in side-by-side alignment in the bracket 103L, being rigidly carried in said bracket as by means of bolts 106L. The bracket, and thus the link mechanism is mounted for oscillation by the trunnions 104L, which are respectively journalled in the side wall of the box and in a central upstanding support 88'. Slidable in these links are admission and exhaust link blocks 107AL and 107EL; the rear ends of the admission and exhaust radius rods 108AL and 108EL being pivoted to the respective link blocks at 109AL and 109EL. At their forward ends, said radius rods are respectively coupled to the admission and exhaust combining levers 90AL and 90EL by pivots 110AL and 110EL.

The take-off connections from the combining levers to the admission and exhaust actuating rockshafts LA and LE are by means of rods 111AL and 111EL which at their rear ends are pivoted to said combining levers respectively at 112AL and 112EL, and at their forward ends are pivoted respectively at 113AL and 113EL to arms 114AL and 114EL (see Figures 11 and 12) fixed upon rockshaft members 115AL and 115EL, which latter extend out through the sides of the box and are there connected by couplings 22 to the respective valve actuating rockshafts LA and LE. Suitable anti-friction bearings, the races of which are indicated at 116L and 116L', are provided for these shafts, at the side wall of the box and in a central supporting structure 117, respectively.

This completes the series of connections from the crossheads, through the oscillating yokes, crossover connections, admission and exhaust links and radius rods, and admission and exhaust combining levers, to the external rods which couple the valve gear mechanism proper to the admission and exhaust cam shafts in the cam boxes; it being noted that most of the parts just described for the left side are duplicated at the right side.

The reversal and adjustment of the valve gear is accomplished by the mechanism now to be described.

*Mechanism for differentially adjusting admission and exhaust*

Figure 9:
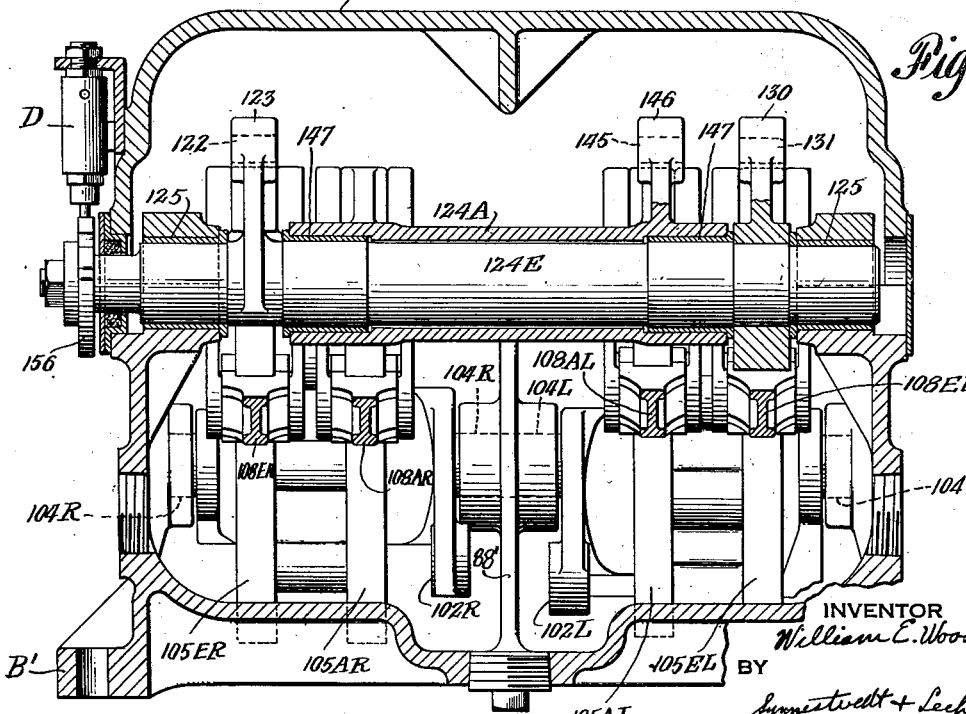
Figure 9 is a transverse section taken about on the line 9—9 of Figure 6, omitting various parts but showing the pairs of swinging links, one pair constituting the link mechanism for the right side and the other constituting the link mechanism for the left side, and also illustrating the transverse shafting constituting part of the adjusting and reversing mechanism.

Referring first to Figures 6, 9, 13 and 14, it will be observed that the axially adjustable reversing rod 37 passes into the box through a packing 118 and supporting sleeve 119, and within the box said rod is pivotally coupled as by linkage 120 and pins 121 and 122, to an arm 123 fixed on the exhaust reversing shaft 124E. Said shaft extends transversely of the box, and as shown in Figure 9 is mounted therein by means of bearings 125.

The reversing shaft 124E also fixedly carries a pair of arms 126EL and 126ER, which are respectively coupled to the left and right exhaust radius rods 108EL and 108ER by means of lifting links, the right exhaust lifting link 127ER being shown in Figure 14, the same being pivoted to the lifting arm 126ER at 128ER, and to the radius rod 108ER at 129ER. By this arrangement, adjustment of the reverse lever 10 in the cab effects corresponding adjustment of the exhaust radius rods in the exhaust links. Adjustment of the admission radius rods 108AL and 108AR is differentially effected, by the progressive differential adjustment mechanism now to be described.

Figure 16:
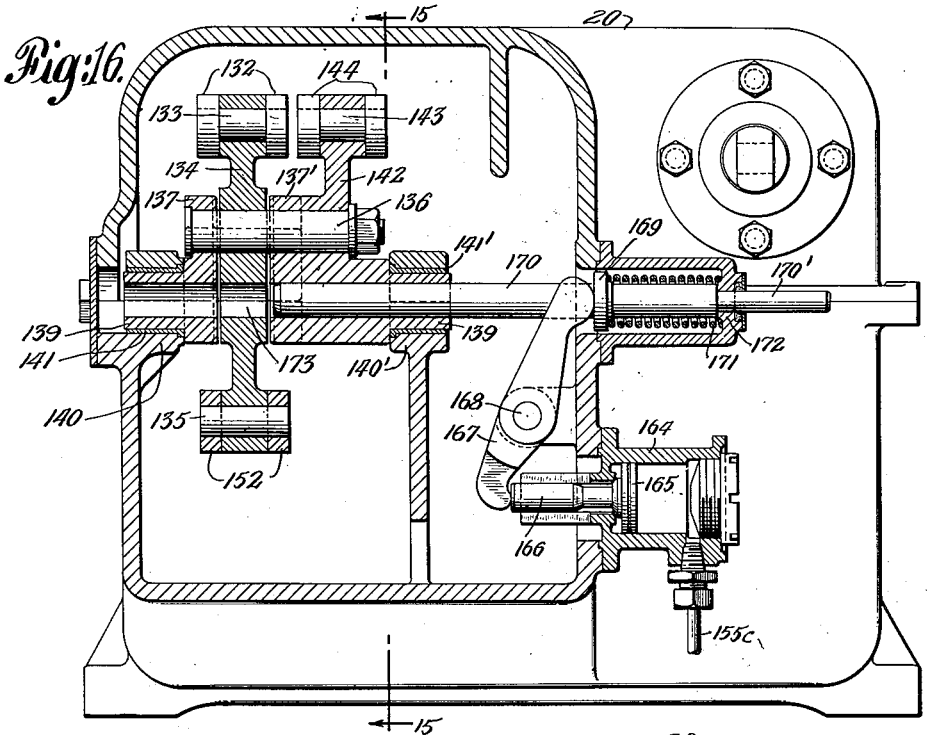
Figure 16 is an irregular transverse section, taken approximately on the line 16—16 of Figures 14 and 15, illustrating the change-over lever arrangement and also a fluid pressure operated device for locking the differential adjustment mechanism against its differential action in the event of failure of the fluid pressure for actuating the change-over piston.
Figure 17:
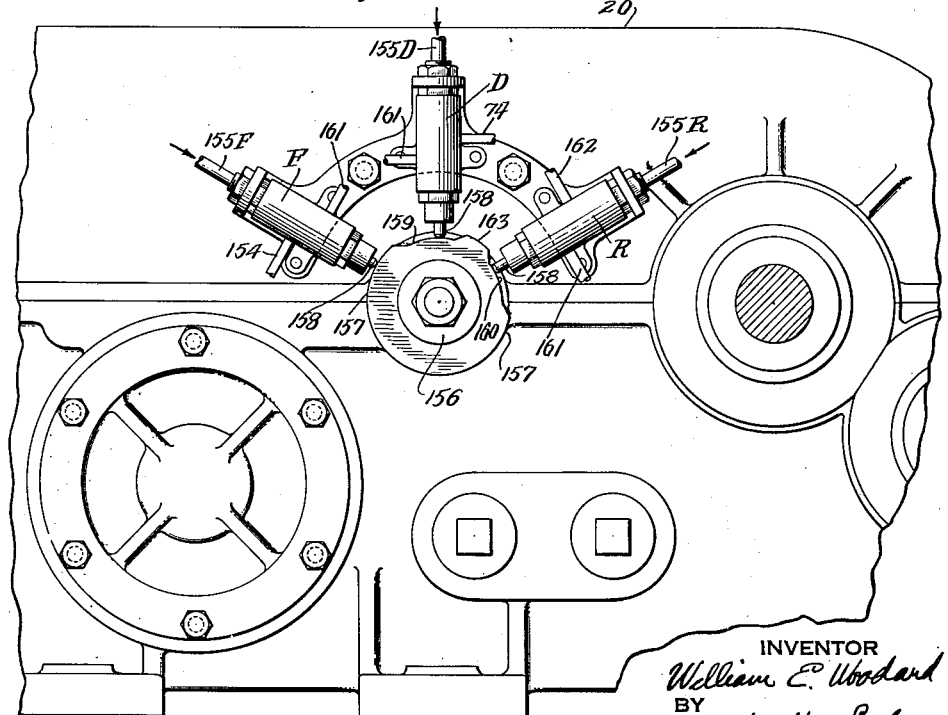
Figure 17 is a fragmentary right side elevation of the valve gear box, i. e. viewed from the near side of Figure 6, showing the forward and reverse conditioning valves, associated with a cam disk mounted on the outer end of the main reversing shaft, for controlling the fluid for actuating the change-over piston shown in Figure 15; and also showing the valve which controls the fluid for actuating the drifting mechanism of Figures 4 and 5.

Adjacent the left end of the exhaust reversing shaft 124E (as seen in Figures 9 and 13) is a lever 130, fixed thereon, and pivotally coupled at 131 to a linkage 132, which extends rearwardly and at its rear end is pivoted at 133 to a rocking lever 134 having a shiftable fulcrum 135 at its lower end (see Figures 15, 15S and 16). The fulcrum 135 is shiftable between two predetermined positions, by mechanism which will be later described.

Near its upper end, the lever 134 mounts a pin 136 which carries a yoke comprising left and right parts 137 and 137', integrally joined together by the front and back cross bars or plates 138, 138', said yoke being pivoted by means of hollow trunnions 139, 139, in fixed supports 140, 140', with interposed bearing sleeves 141, 141'. Thus, when the lever 134 is rocked about its fulcrum 135, in accordance with adjustments of the exhaust reversing shaft 124E, by means of the levers and linkage 130, 131, 132 and 133, the said lever 134 carries with it the yoke structure 137, 137', which latter is thus adjusted to different positions on its trunnions 139, the resulting motion of adjustment delivered to the yoke structure being amplified, since the latter rocks about a fulcrum (139) positioned intermediate the centers of pins 135 and 136. This effects a change in relative angularity between the levers 134 and 142 (as shown in Figure 15S).

This amplified motion is taken by the lever 142, integral with the yoke structure, through pivot 143, linkage 144, pivot 145, and arm 146, to the admission reversing shaft 124A, which latter is in the form of a sleeve surrounding the exhaust reversing shaft 124E, and is pivoted thereon by interposed bearings 147 (see Figure 9).

The admission reversing shaft 124A fixedly carries left and right admission adjustment arms 126AL, 126AR, pivotally connected respectively at 128AL and 128AR to the left and right admission lifting links 127AL and 127AR, which at their lower ends are pivoted at 129AL and 129AR respectively, to the left and right admission radius rods 108AL and 108AR (see Figure 7L).

In the extreme forward position of adjustment of the engineman's reverse lever 10, and thus of the valve gear itself (which is the position generally shown in the drawings) the radius rods are all side-by-side in their uppermost position, with their link blocks adjacent the upper ends of the links.

A similar side-by-side condition obtains in full-reverse position of the valve gear, i. e., the radius rods and link blocks are all adjacent the bottom ends of the links, at which position the parts appear substantially as shown in the diagrammatic view of Figure 27.

Between these two extreme positions, however, owing to the accelerated action imposed upon the admission reversing shaft 124A through the leverage system 134, 142, the adjustment of the reverse lever 10 effects a differing (termed herein "differential") progression of the admission and exhaust link blocks in the admission and exhaust links, which will be fully explained hereinafter, in connection with the description of diagrammatic Figures 20 to 27. However, it should here be stated that since such a differential progression occurs when moving from either extreme position toward the neutral range, it is necessary that an inversion of the differentially adjusted relation of the admission and exhaust parts shall occur in the said neutral range.

This inversion is accomplished by the changeover mechanism now to be described.

Change-over mechanism

As seen in Figures 13 to 16, an air cylinder 148 is mounted on the back end of the valve gear box 20. A piston 147 therein has a piston stem 150, extending through packing gland 151, and connected to a link 152 as by pivot 153, the forward end of said link being coupled to the shiftable fulcrum 135 (Figures 15 and 16).

When the valve gear is in its forward range, the piston 149, and thus the fulcrum 135 for the shifting lever 134, is held at the extreme rearward position by compressed air delivered to the cylinder 148 through pipe 154. This is accomplished by the mechanism shown in Figures 17, 18 and 19, as follows:

From the compressed air reservoir (marked RES) air is admitted by way of valve X, pipe 155, and pipe 155F, into the forward control or conditioning valve F. Cam 156, which is fixed on the outer end of the exhaust reversing shaft 124E, has a high surface 157 which, in the forward gear range, lifts the stem 158 of the valve V, within valve casing F, and admits compressed air to the pipe 154, and thus to the forward face of the piston 149. (The internal construction of the valve F is identical with the construction shown in Figure 18.) This action holds the piston 149, and thus the fulcrum or pivot 135, in the position shown in Figure 15, during the forward-gear range of adjustment.

When the valve gear is reversed, the counterclockwise turning of the exhaust reversing shaft 124E turns the cam 156, until the stem 158 of the forward conditioning valve F (Figures 17 and 19) drops to the low surface 159, and the stem 158 of the reverse conditioning valve R rides up from the low surface 160 to the high surface 157. Valve V in valve body F thus closes the pipe connection 155, and valve V' therein opens pipe 154 to the exhaust port 161; while valve V in valve body R opens communication from the reservoir through pipes 155 and 155R to pipe 162 which is coupled to the rear end of cylinder 148 (Figures 15 and 19). This results in shifting the piston 149 forwardly (to the right in Figure 15, to the position shown in Figure 19), and correspondingly shifting the pivot 135 in the same direction.

This sudden shift of the pivot 135 causes the lever 134 to turn counterclockwise about center 133, which, during the change-over, becomes a temporary fulcrum point. Since the pin 136 is intermediate pivot 133 and trunnion 139, the lever 142 is turned in a clockwise direction about axis 139, with the result that there is an inversion of the adjusted relation of the admission and exhaust radius rod link blocks. In short, just as the latter are moving down past the center of oscillation of the links, the former are shifted momentarily back to a point above said center of oscillation.

From this point on, as the reversing lever is moved farther back toward full reverse position, the differential adjustment of the admission and exhaust radius rods is resumed, until when the extreme reverse-gear position is reached, all the link blocks (admission and exhaust) are in the bottom positions in the links. This action will appear more clearly when the diagrammatic views are discussed.

Drifting mechanism

During the movement through the neutral range, i. e. from forward mid-gear to reverse mid-gear, or vice versa, while the change-over mechanism is carrying out its function, the drifting control valve D (Figures 17, 18 and 19) is also operating. As the valve gear adjustment passes from the forward mid-gear position slightly back into the neutral zone, the stem 158 of said valve D rides up from the low cam surface 159 onto the high cam surface 163, which opens valve V in the valve body D and permits air from pipe 155D to pass through pipe 74 which branches and delivers into the top of both of the air cylinders 73 on top of the left and right cam boxes LB and RB, with the results already described with reference to Figures 3 to 5. The piping diagram of Figure 19 shows fragmentarily only one of the cam boxes, with a branch of pipe 74 connected to the drifting cylinder thereof, but it will be understood that the other branch pipe 74 connects to the one on the other side of the locomotive.

When the valve gear is moved from the middle part of the neutral range to either the forward mid-gear or reverse mid-gear position, the valve stem 158 of valve D rides down either onto the cam surface 159 or the cam surface 160, respectively, closing off the source of supply from pipe 155D, and opening pipe 74 to the exhaust port 161, thereby cutting out the drifting operation of the valves in the steam chests of the cylinders.

Automatic cut-out device

In case of clogging of the air supply line, or failure of air pressure in the reservoir, or if for any reason it is desirable or necessary to shut off the air supply to the valves F, R, D, as by means of valve X, the differential adjustment feature of the admission and exhaust radius rods is automatically cut out, by the mechanism shown in Figures 16 and 19, as will now appear. The main air feed line 155 has another branch 155C, constantly connected to a small cylinder 164 containing a piston 165. The stem 166 of said piston engages one end of a lever 167 which is pivoted at 168 on a bracket fixed inside the valve gear box. The other end of said lever bears upon a shoulder 169 fixed upon a plunger 170, and by virtue of the air pressure in cylinder 174, holds the plunger 170 in its outermost position (i. e. toward the right, in Figure 16) against the pressure of the spring 171 which seats against an abutment 172. The stem or plunger 170 extends centrally through one of the hollow trunnions 139, in a position to be projected into or through a transverse aperture 173 formed in the shifting lever 134.

Upon failure or shutting off of the air pressure in the system, the spring 171 expands and thrusts the plunger 170 into the aperture 173, thereby locking the lever 134 to pivot about the same center as the trunnions 139. If the aperture 173 is not in registry with the plunger 170 at the time of air pressure failure, the failure of pressure upon piston 149 of the change-over mechanism, or any effort by the engineman to adjust the valve gear, or both, will result in the lever 134 shifting its position until the said parts are in registry, whereupon the desired locking action will automatically occur. The valve gear is not thereby disabled, but the admission and exhaust adjustments simply take place identically, instead of differentially. The novel, advantageous timing of the valves secured by the present valve gear is thus temporarily eliminated, and the entire valve gear produces valve events similar to an ordinary valve gear.

The locking plunger 170 has an external projection 170', which serves to indicate visually whether the fluid pressure system is in operation or not.

Summarizing the foregoing, it will be evident that the apparatus which coordinates the admission and exhaust adjusting mechanisms effects one positive relationship of the adjustment rates of said mechanisms when the fluid pressure system is functioning, and effects a different positive relationship of their adjustment rates when the fluid pressure is off (as when valve X is shut off); and further that the plunger device 170' gives a visual indication, exteriorly of the enclosing housing, as to which relationship of adjustment rates is in effect.

*Adjusting and reversing operations*

By reference to the line diagrams of Figures 20 to 27 inclusive, which illustrate the coordinated differential adjustment of the admission and exhaust, in both forward and reverse, for the left-hand side of the mechanism, it will be observed that the arcuate links 105AL and 105EL (for admission and exhaust) are shown as an identity, since these are mounted together and are oscillated by a common connection from the right-hand side of the mechanism (as shown in Figure 8RL).

In full-gear forward position (Figure 20) all the adjustable admission and exhaust parts, associated with said links, are also in parallelism, and therefore appear as a single-line diagram. The positioning of these parts in this view corresponds with the position of the entire mechanism as shown in the structural views generally.

Although the mechanism may be designed to effect any desired cut-off in the said full-gear position, the valve gear as shown herein has been designed to give, at full-gear (Fig. 20), a cut-off at about 85% of the piston stroke. With the cranks at the particular point of their cycle shown in Figures 1F and 2, the left-hand piston being at the mid-point of its forward stroke, and all the valve gear parts in forward full-gear position, the corresponding positions of the admission and exhaust cams and valves (for the left-hand side) appear in Figure 3. It will be seen from Figure 3 that the admission valve 54 at the crank end of the cylinder is still open, the piston LP having traversed only 50% of its forward stroke. The open admission valve will close when the admission cam 62 has turned clockwise (in said figure) to such extent that the roller 63 will ride down to the striking point S, which will occur when piston LP has traversed 85% of its stroke.

At the said full-gear cut-off of 85%, the valve gear shown herein is designed to effect preadmission at .2% of the piston stroke before commencement of the particular working stroke being considered. Release is timed to occur at 95.8% of the stroke; and compression at 6.7% prior to the end of the return stroke. Thus it will be noted from Figure 3 that the exhaust valve 58 at the head end of the left-hand cylinder is still open, and this exhaust valve will not close to effect compression until the exhaust cam 68 has turned counterclockwise to the point where the associated roller 69 rides down to the striking point S', which occurs when the piston LP is 6.7% from the end of its stroke.

Referring still to the forward full-gear position (Figure 20) since the admission and exhaust link blocks are adjacent the upper ends of their respective links, the admission and exhaust combining levers 90AL and 90EL (Figures 6 and 10) are receiving the maximum available component of motion from the link mechanism. Equivalent conditions exist, of course, in the opposite extreme position (full-gear reverse) which is shown in the diagram of Figure 27.

Intermediate positions of the link blocks in their links will, of course, effect earlier adjustments of cut-off, and coordinated adjustments of the other valve events, as will now appear.

From Figures 21 to 26, showing various intermediate positions, it will be obvious that the exhaust radius rod 108EL is adjusted substantially in direct proportion to the turning of the exhaust reversing shaft 124E, which, through the connection shown, is coupled to the reach rod 37, and thence to the reverse lever in the cab.

Figure 20:
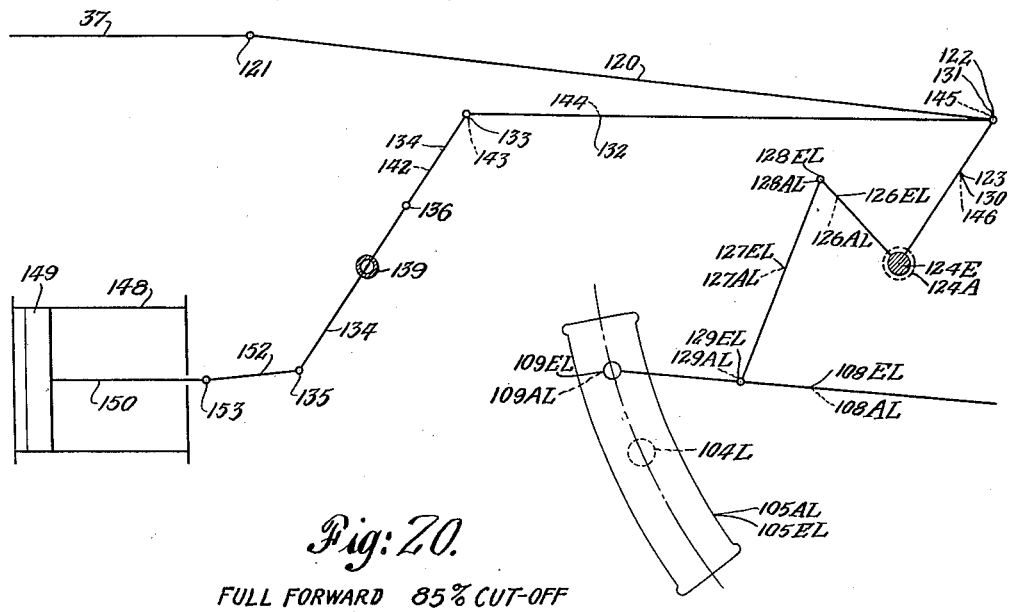
Figure 20 is a line diagram of the arcuate swinging links, radius rods, lifting arms, etc. (both admission and exhaust) for the left side of the locomotive, showing also the differential adjustment mechanism, illustrating the relative positions of the parts in full-gear forward position.
Figure 21:
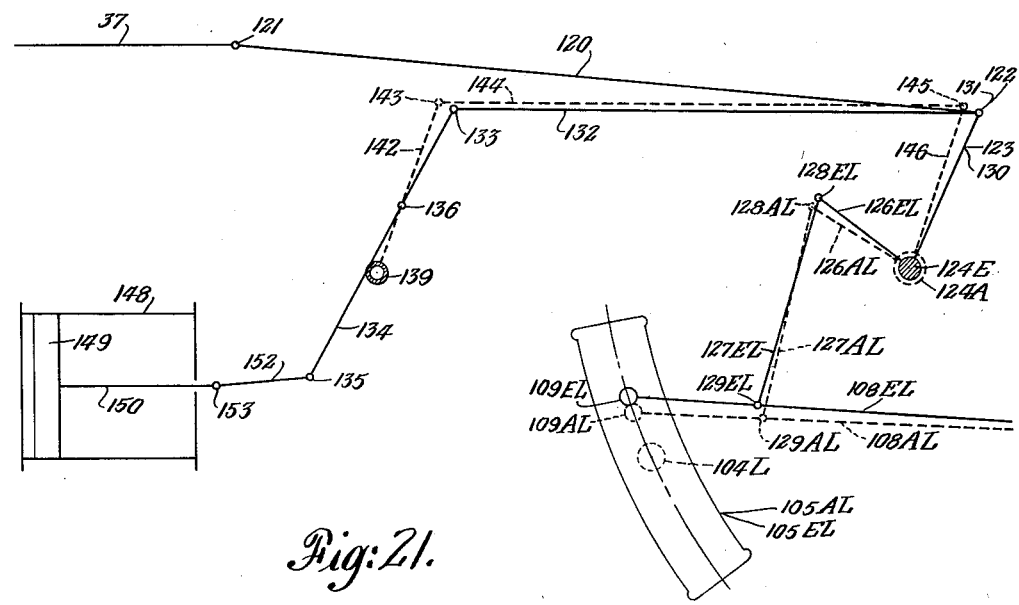
Figure 21 is a similar diagram, showing said parts adjusted to the position corresponding to 60% cut-off, in forward operation.

As shaft 124E is turned counterclockwise, from the forward full-gear position of Figure 20, for example to the 60% forward-gear position of Figure 21, such adjustment turns the lever 134 in the same sense about its fulcrum 135. This action, through the intermediation of pin 136, turns the lever 142 in the same direction, but through a larger angle owing to the fact that said lever 142 turns about the fulcrum 139. Therefore, the admission reversing shaft 124A, which is coupled to said lever 142 by the parts 143, 144, 145 and 146, turns in the same sense as the exhaust reversing shaft 124E, but at a more rapid rate, so that the admission radius rod 108AL with its link block moves downwardly faster than the corresponding exhaust adjusting parts, with the result that at 60% cut-off (Figure 21) the pivot center 109AL of the admission radius rod link block has approached nearer to the center of oscillation 104L of the link mechanism than has the corresponding pivot center 109EL of the exhaust radius rod link block. Stated in another way, the exhaust radius rod has lagged behind, so that at 60% cut-off, the exhaust valve events (release and compression), though they occur earlier than at full-gear, which is desirable, do not occur as early as they otherwise would.

Figure 22:
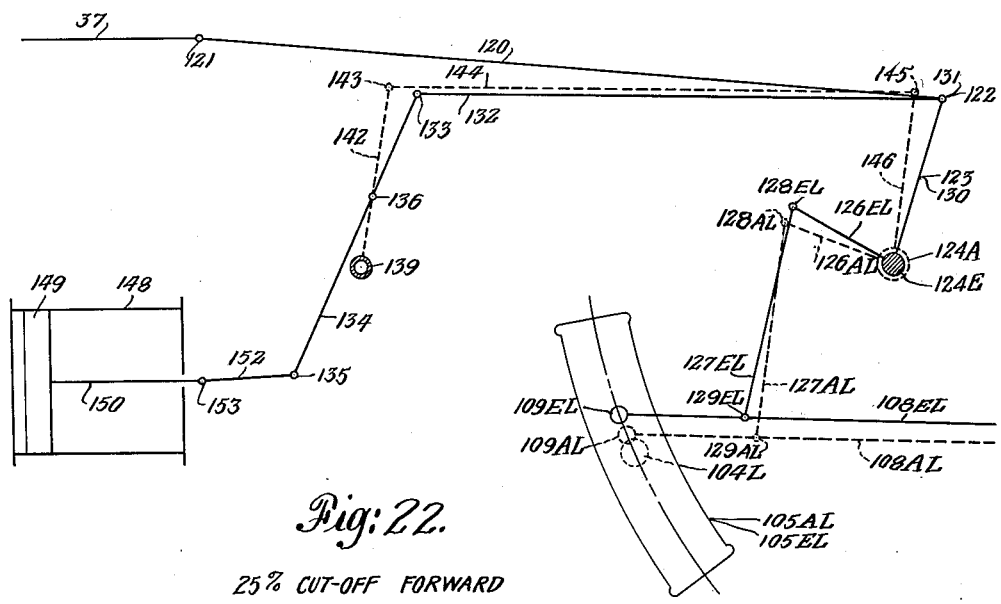
Figure 22 is a similar diagram, showing a further adjustment of the parts, i. e. to the position corresponding to 25% cut-off in forward operation.

Figure 22 illustrates a further adjustment of the valve gear, to the point where the admission valves produce a cut-off at 25% of the piston stroke, and it will be observed that the gap between the admission and exhaust link block pivot centers 109AL and 109EL has still further widened.

It should here be pointed out that with this construction it is feasible to operate the locomotive at a cut-off adjustment as short as about 8% of the piston stroke, at which time the pivot center 109AL is at the center of oscillation 104L of the link mechanism, while the exhaust link block pivot center 109EL is still appreciably spaced from said center of oscillation.

Figure 23:
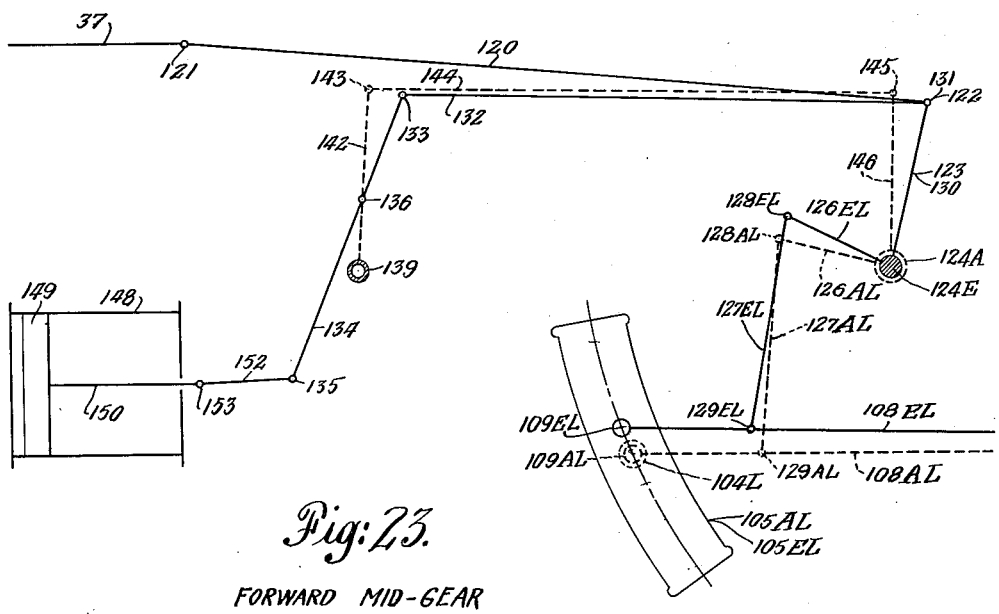
Figure 23 is a similar diagram, showing the parts at forward mid-gear position.

Figure 23 shows the parts in this position, for forward gear, at which time the admission combining lever 90AL receives no component of motion from the oscillating link 105AL, but is moved only by the main oscillating yoke 84L in synchronism with the left-hand crosshead, which gives a timing of the admission valves for cut-off just equal to the preadmission. This position is the "forward mid-gear" position heretofore discussed, and the corresponding position of the reverse lever 10 in the cab is indicated at FM on the quadrant Q (Figure 19).

Figure 24:
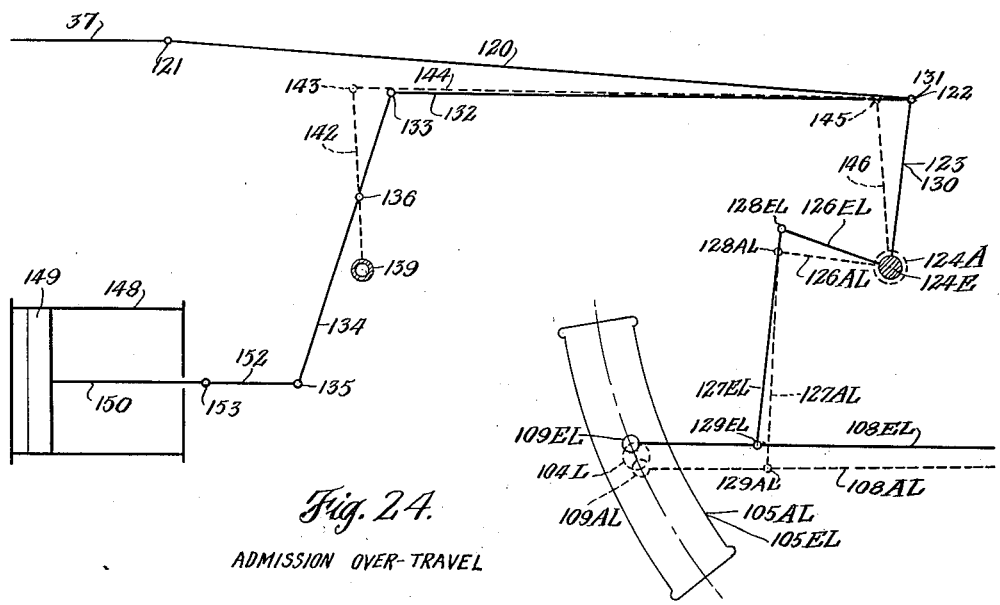
Figure 24 is a similar diagram, showing the parts when moved part-way into the neutral zone, to what may be termed "admission over-travel" position, just before the relative inversion of the admission and exhaust parts has taken place.

Figure 24 shows the further progression of the parts which occurs when the reverse lever 10 has been moved from forward mid-gear position part-way through the neutral zone, to a position which may for convenience be termed "admission over-travel" position. At this point, the admission link center 109AL has slightly over-travelled the center of oscillation 104L of the link, and the exhaust link block center 109EL is approaching said center of oscillation.

A slight further movement of the reverse lever 10, substantially to the mid-point of the neutral range (as shown in Figure 19) brings the cam 156 to a point which permits valve stem 158 of valve F to ride down onto cam surface 159, and which substantially simultaneously causes stem 158 of valve R to ride up on surface 157, thereby shifting piston 149 to the right, i. e., to the position shown in Figure 19.

Figure 25:
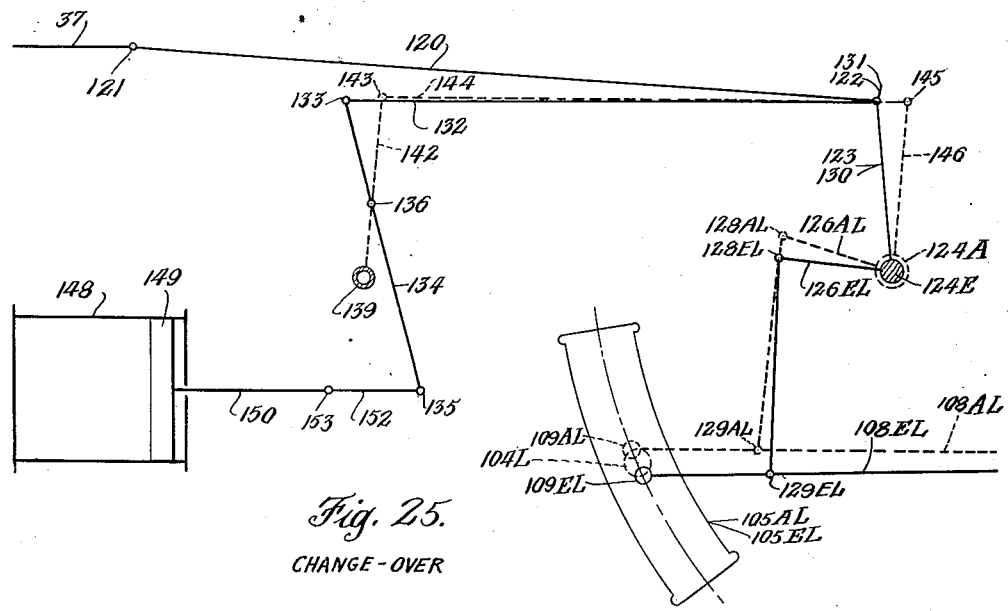
Figure 25 is a similar diagram, showing the parts farther back in the neutral zone, at what may be termed "change-over" position, immediately after the shifting device or "inverter" has operated.

Figure 25 illustrates the "change-over" which occurs at this time. It will be seen by comparison of Figure 25 with Figure 24, that the action of the piston 149, in shifting fulcrum point 135 to the right, effects an inversion of the relative positions of adjustment of the admission and exhaust link block centers 109AL and 109EL, with reference to each other and with reference to the center of oscillation 104L of the link.

Further rearward adjustment of the lever 10 brings the mechanism to the reverse mid-gear position, illustrated in Figure 26, which in reverse operation corresponds to the forward mid-gear position shown in Figure 23.

From the reverse mid-gear position of Figure 26 to the full-gear reverse position of Figure 27, the same progressive differential adjustments between the admission and exhaust radius rods take place, throughout the reverse range of operation, just as in the forward range such as illustrated by Figures 20 to 23.

General operation of the mechanism

The actuation of the valve gear from the crossheads, the adjustment and reversal of the valve gear from the reverse lever in the cab, and the actuation of the valves from the valve gear proper, will for the most part be quite clear from the foregoing description of the mechanism itself, but certain points should here be summarized.

The engineman can adjust the valve gear throughout the forward and reverse operating ranges, just as in usual practice, by moving a single reverse lever in the cab, setting the same with relation to the cut-off indications on the quadrant in the ordinary manner, according to the running conditions. He can, however, adjust the valve gear to much earlier cut-offs than heretofore available, and he can do this without the necessity of exercising special care to avoid unintentionally passing from the forward-gear range into the reverse-gear range, or vice versa, since by the present invention there is an extended neutral zone or range between forward mid-gear position FM and reverse mid-gear position RM (Figure 19). The change-over of the differential mechanism, which occurs while moving from forward mid-gear to reverse mid-gear, causes no practical inconvenience, since at that time it is customary practice to close the throttle.

Furthermore, the change-over or conditioning of the differential admission and exhaust adjustment mechanisms for operation in the forward range or reverse range is entirely automatic, and takes place in the extended neutral range. An additional function is performed by the extended neutral range, in that, in the middle portion of said range, the cam surface 163 causes the mechanism automatically to open valves at both ends of both cylinders, for drifting purposes (in this instance the admission valves, although the drifting mechanism could as well be coupled to the exhaust valves, or to both); and since the engineer usually closes the throttle when going from the forward range into the reverse range, or vice versa, the opening of the admission valves merely results in preventing the building up of positive or negative pressures in the cylinders, and avoids the drawing in of cinders through the exhaust passages.

The reason for having valve D operate the drifting mechanism only in the middle part of the neutral range is to assure that the said mechanism does not interfere with normal running operations at the minimum practical cut-offs, which are exactly at forward mid-gear and reverse mid-gear positions.

Typical valve events

It will now clearly appear that although the adjustment and reversal of all of the valve events are secured, in this valve gear, by means of a common control lever in the cab, there is a substantially complete separation between the admission valve events on the one hand and the exhaust valve events on the other hand, in the sense that the most desirable relationship of these events, for any cut-off setting, can be secured, through the medium of independent combining mechanisms, the control of which is positively coordinated in a predetermined differential relation.

Typical valve events secured by the invention, in contrast with the corresponding events ordinarily secured in the prior art, are shown by the following table. In general, it may be said that, by the present invention, the range of release and compression values, throughout the range of cut-off adjustment, is held within workable limits, and considered as a whole is greatly superior to prior practice.

*Events in terms of percentages of piston stroke*

| Cut-off | Preadmission | | Release | | Compression | |
|---|---|---|---|---|---|---|
| | Prior art | Present invention | Prior art | Present invention | Prior art | Present invention |
| 85 | .2 | .2 | 92 | 95.8 | 3 | 6.7 |
| 60 | .7 | .65 | 80 | 92 | 9 | 12.3 |
| 25 | 3 | 2.6 | 55 | 87.2 | 23 | 19.4 |
| 15 | 5 | 4.7 | 46 | 84.9 | 30 | 22.5 |

The above figures for the prior art are approximate averages for general practice, except for the events at 15% cut-off, which are only theoretical, since as a practical matter the ordinary valve gear cannot be operated at less than about 25%, as the early release and compression become prohibitive. The figures for the present invention show average results secured from the mechanism as illustrated in the drawings, but it will be understood that the invention is not limited to a proportioning of the parts which will produce these particular figures, since by altering the proportions and relations of the various parts of the valve gear, particularly of the differential control mechanism, various desired results can be secured. The marked improvement over the prior art, particularly in the release and compression events, especially at very early cut-offs, is obvious from the table, without further discussion.

Summary of advantages

Certain of the operating advantages have already been summarized above, and the substantial improvement in valve events has been fully set forth. The description of the structure itself also makes clear how the objects and advantages set out in the early part of the specification are secured. A few points should, however, here be summarized.

Many of the admission and exhaust actuating parts, and many of the parts for the right and left sides, are or can be made as counterpart members, thus reducing the number of parts to be carried in stock for repairs and replacements, simplifying assembly, disassembly and repair, and simplifying the adjustment of the valve gear after making repairs or replacements.

Though many aspects of the invention are not limited to the link-and-radius-rod type of valve gear, nor to a valve gear driven from the two crossheads only, there are novel features involved in this particular regard, which are included in the embodiment herein illustrated and described. Thus, the preferred embodiment combines the advantage of differential adjustment of the admission and exhaust events for both cylinders with the simplicity of the link-and-radius-rod type of mechanism, the simplicity and accuracy of actuating the same from the two crossheads only, and further the simplicity of coordinated differential adjustment from a single lever similar to the usual reverse lever in the cab.

Furthermore, though securing a practical divorcement of the admission and exhaust events, the preferred embodiment herein disclosed combines therewith certain advantageous features similar to those found in the mechanism of my above-mentioned Patent No. 2,136,405, particularly the housing of all of the mechanism as a compact unit in a common enclosure or box which is mounted rigidly with the cylinders and other parts, between the axes of the two cylinders, the actuation of the valve gear proper by means of relatively short rockshafts and the actuation of the cam shafts and thus of the valves from other rockshafts, all of which are mounted in antifriction bearings and pass through the walls of the box, wherein the internal working parts may run in a bath of oil, sealed as against entrance of moisture and grit.

In utilizing air pressure for effecting certain of the automatic operations, the normal supply of compressed air which is carried for the usual air brakes, may be drawn upon, and a common supply is used for the change-over mechanism, the drifting mechanism, and the automatic cut-out mechanism.

Various other advantages will be apparent to those skilled in the art, and the invention is therefore not limited to the specific objects and advantages enumerated, nor to the specific structural embodiment herein shown, except as required by the terms of the claims.

Claims on subject-matter common to this case and my copending application 217,360 filed July 5, 1938, are included in the present case.

I claim:

1. In a locomotive engine having a cylinder with piston therein, admission valve means and exhaust valve means, adjustable mechanisms for varying and reversing the timing of said two valve means, respectively, with relation to piston movements, and controllable adjustment means adapted to move said mechanisms through predetermined adjustment ranges, including means for positively setting one of said mechanisms at any of a series of positions within its range bearing predetermined relations to a differing series of adjusted positions of the other mechanism within its range.

2. For locomotive engines and the like, having cylinders, admission valve means and exhaust valve means, pistons reciprocable in said cylinders, and moving parts actuated by said pistons, a valve gear receiving an actuating motion from one of said moving parts for variably timing the operation of the valve means with relation to piston movements, comprising: mechanism progressively adjustable to operatively utilize a predetermined range of amplitude of the motion derived from said actuating part, for variably timing the admission valve means; and mechanism progressively adjustable to operatively utilize a predeterminedly limited portion only of said range of amplitude, for variably timing the exhaust valve means.

3. Valve gear for a locomotive or like engine having cylinders, pistons and moving parts actuated thereby, and relatively movable admission valve means and exhaust valve means for said cylinders, said valve gear being coupled to receive an oscillatory actuating motion from one of said moving parts for variably timing the operation of the valve means with relation to piston movements, and comprising mechanism progressively adjustable to vary the timing of one of said valve means, mechanism adjustable at a predetermined coordinated different rate of progression to vary the timing of the other of said valve means, and means normally acting to ensure such coordination.

4. For a fluid pressure engine having cylinders, pistons and moving parts actuated thereby, and relatively movable admission valve means and exhaust valve means for said cylinders, a valve gear having actuating connections from a plurality of said parts moving in different phase relation and comprising mechanism adapted to variably combine the motions derived from said parts in a progressing ratio for the timing of the admission valve means, mechanism adapted to combine said motions in a coordinated differently progressing ratio for the timing of the exhaust valve means, and means normally acting to ensure such coordination.

5. For a locomotive having cylinders, valves, pistons and parts driven thereby, a valve gear coupled to derive its motion from driven parts of each of a plurality of said pistons, comprising mechanism for adjustably timing admission valve events, mechanism for adjustably timing exhaust valve events, and mechanism for positively coordinating said timing adjustments in a predetermined varying relation throughout at least a substantial portion of the range of adjustment.

6. For locomotive engines and the like, a valve gear comprising: mechanism for timing admission valve events, progressively adjustable from a full-gear forward position whereat a late cut-off is secured, through a mid-gear position of earliest cut-off, to a full-gear reverse position of late cut-off; mechanism for timing exhaust valve events, progressively adjustable from a full-gear forward position whereat there is a late timing of the release and compression events, through intermediate positions of earlier timing, inclusive of a non-operating mid-position, to a full-gear reverse position of late release and compression; and apparatus for effecting a predetermined lag in the progressive adjustment of the latter mechanism from either extreme position toward its mid-position with relation to the adjustment of the former mechanism from the corresponding extreme position toward mid-gear.

7. For locomotive engines and the like, a valve gear comprising: mechanism for timing admission valve events, progressively adjustable from a full-gear forward position whereat a late cut-off is secured, through a mid-gear position of earliest cut-off, to a full-gear reverse position of late cut-off; mechanism for timing exhaust valve events, progressively adjustable from a full-gear forward position whereat there is a late timing of the release and compression events, through intermediate positions of earlier timing, inclusive of a non-operating mid-position, to a full-gear reverse position of late release and compression; and apparatus for effecting a predetermined lag in the progressive adjustment of the latter mechanism from either extreme position toward its mid-position with relation to the adjustment of the former mechanism from the corresponding extreme position toward mid-gear, including means for inverting the adjusted relationship of said mechanisms when adjacent their mid-positions.

8. For locomotive engines and the like, a valve gear comprising: mechanism for timing admission valve events, progressively adjustable from a full-gear forward position whereat a late cut-off is secured, through a mid-gear position of earliest cut-off, to a full-gear reverse position of late cut-off; mechanism for timing exhaust valve events, progressively adjustable from a full-gear forward position whereat there is a late timing of the release and compression events, through intermediate positions of earlier timing, inclusive of a non-operating mid-position, to a full-gear reverse position of late release and compression; apparatus for effecting a predetermined lag in the progressive adjustment of the latter mechanism from either extreme position toward its mid-position with relation to the adjustment of the former mechanism from the corresponding extreme position toward mid-gear, including means for inverting the adjusted relationship of said mechanisms when adjacent their mid-positions; and means for rendering said apparatus ineffective, whereby the adjustment of said mechanisms is effected without relative lag.

9. For locomotive engines and the like, having cylinders, admission valves and exhaust valves, pistons reciprocable in said cylinders, and driven parts actuated by said pistons, a valve gear adjustably combining the out-of-phase motions derived from a plurality of said parts for timing the admission valves and the exhaust valves with relation to piston movements, said valve gear comprising mechanism for variably timing the admission valves adapted to operatively utilize substantially the entire range of combination of said motions when adjusting from maximum cut-off in forward operation through mid-gear to maximum cut-off in reverse operation, and mechanism for variably timing the exhaust valves adapted to operatively utilize only a portion of said range.

10. For locomotive engines and the like having cylinders, admission valves and exhaust valves, pistons reciprocable in said cylinders, and driven parts actuated by said pistons, a valve gear adjustably combining the out-of-phase motions derived from a plurality of said parts for timing the admission valves and the exhaust valves with relation to piston movements, said valve gear comprising mechanism for variably timing the admission valves adapted to operatively utilize substantially the entire range of combination of said motions when adjusting from maximum cut-off in forward operation through mid-gear to maximum cut-off in reverse operation, mechanism for variably timing the exhaust valves adapted to operatively utilize only a portion of said range, and apparatus adapted to coordinate both said mechanisms, whereby the timing of the exhaust valves as to release and compression events is kept within practical operating limits with relation to the timing of the admission valves at early cut-offs.

11. For a fluid pressure engine having cylinders, pistons and moving parts actuated thereby, and relatively movable admission valve means and exhaust valve means for said cylinders, a valve gear having actuating connections from a plurality of said parts moving in different phase relation and comprising mechanism for combining the motions derived from said parts and for changing the direction of one of said motions relative to the other, for actuation of the valve means in forward and reverse operation, including means for varying, in automatically differing simultaneous progressions, the combining of said motions with respect to the timing of the admission valve means and the exhaust valve means in forward and reverse operation.

12. For a fluid pressure engine having cylinders, pistons and moving parts actuated thereby, and relatively movable admission valve means and exhaust valve means for said cylinders, a valve gear having actuating connections from a plurality of said parts moving in different phase relation and comprising mechanism for variably combining the motions derived from said parts for the timing of one of said valve means, and mechanism for variably combining said motions for the timing of the other of said valve means at a predetermined rate of variation different from the rate of variation in the combining of motions for the first valve means, and a common control for both said mechanisms.

13. For a locomotive engine or the like including a pair of cylinders with pistons and other moving parts reciprocated thereby, and admission valve means and exhaust valve means for each cylinder, mechanism for combining motions derived from a pair of reciprocating parts, one actuated by each piston, and for delivering such combined motions to actuate the admission and exhaust valve means of both cylinders in timed relation to the movements of the respective pistons, and means for controllably altering, in automatically differing simultaneous progressions, the combination of motions delivered to actuate one of said valve means relative to the combination delivered to actuate the other.

14. For a locomotive engine or the like including a pair of cylinders with pistons and other moving parts reciprocated thereby, and admission valve means and exhaust valve means for each cylinder, mechanism for variably combining motions derived from a pair of reciprocating parts, one actuated by each piston, and for delivering such combined motions to actuate the admission and exhaust valve means of both cylinders in timed relation to the movements of the respective pistons, and means for controllably progressively altering the combination of motions delivered to actuate one of said valve means in a positively predetermined differential relation to the variation in the combining of motions delivered for the timing of the other of said valve means.

15. For a locomotive engine or the like including a pair of cylinders with pistons and other moving parts reciprocated thereby, and admission valve means and exhaust valve means for each cylinder, mechanism for combining, variably as to magnitude and direction, motions derived from a pair of reciprocating parts, one actuated by each piston, and for delivering such combined motions to actuate the admission and exhaust valve means of both cylinders in timed relation to the movements of the respective pistons, and means for controllably progressively altering the combination of motions delivered to actuate one of said valve means in a positively predetermined differential relation to the variation in the combining of motions delivered for the timing of the other of said valve means in both forward and reverse operation.

16. For locomotive engines and the like, having cylinders, relatively movable admission and exhaust valve devices, pistons reciprocable in said cylinders, and moving parts actuated by said pistons, a valve gear actuated by and adapted to combine for the timing of the valve devices motions derived from a plurality of said parts having out-of-phase movement, comprising combining mechanisms individually progressively adjustable for the admission and exhaust valve devices, and means for positively securing predeterminedly differing simultaneous progressions in the adjustment of said mechanisms throughout an extended range of adjustment for forward motion of the engine.

17. For locomotive engines and the like, having cylinders, relatively movable admission and exhaust valve devices, pistons reciprocable in said cylinders, and moving parts actuated by said pistons, a valve gear actuated by and adapted to combine for the timing of the valve devices motions derived from a plurality of said parts having out-of-phase movement, comprising combining mechanisms individually progressively adjustable for the admission and exhaust valve devices, means for positively securing predeterminedly differing simultaneous progressions in the adjustment of said mechanisms throughout an extended range of adjustment for forward motion of the engine, and means for similarly securing an equivalent differing adjustment throughout an extended range of adjustment for backward motion of the engine.

18. For locomotive engines and the like, having cylinders, relatively movable admission and exhaust valve devices, pistons reciprocable in said cylinders, and reciprocating parts actuated by said pistons, a valve gear actuated by and adapted to combine for the timing of the valve devices motions derived from a plurality of said reciprocating parts having out-of-phase movement comprising for each cylinder individual progressively adjustable mechanisms for combining said motions for the timing of the admission and exhaust valve devices, respectively, and apparatus adapted to positively coordinate in predetermined relation the progressive adjustments of the several combining mechanisms.

19. For locomotive engines and the like, having cylinders, relatively movable admission and exhaust valve devices, pistons reciprocable in said cylinders, and reciprocating parts actuated by said pistons, a valve gear actuated by and adapted to combine for the timing of the valve devices motions derived from a plurality of said reciprocating parts having out-of-phase movement, comprising for each cylinder individual progressively adjustable mechanisms for combining said motions for the timing of the admission and exhaust valve devices, apparatus adapted to positively coordinate in predetermined relation the progressive adjustments of the several combining mechanisms including a member controllable by the engineman, and differentially movable connections from said member to said mechanisms.

20. For locomotive engines and the like, a valve gear comprising separately adjustable and reversible combining mechanisms for actuating admission and exhaust valves, respectively; a reversing shaft coupled to the admission combining mechanism; an independently movable reversing shaft coupled to the exhaust combining mechanism; an engineman's control member coupled to one of said reversing shafts; and connections to the other shaft incorporating means for altering the amplitude of the motion transmitted to one shaft relative to the other.

21. For locomotive engines and the like, a valve gear comprising separately adjustable and reversible combining mechanisms for actuating admission and exhaust valves, respectively; a reversing shaft coupled to the admission combining mechanism; an independently movable reversing shaft coupled to the exhaust combining mechanism; an engineman's control member coupled to one of said reversing shafts; and connections from said shaft to the other shaft incorporating means for altering the amplitude of the motion transmitted from one shaft to the other.

22. For locomotive engines and the like, a valve gear comprising separately adjustable and reversible combining mechanisms for actuating admission and exhaust valves, respectively, and adapted for variable motion relative to each other throughout a forward range of adjustment and a reverse range of adjustment, and for relative inversion of position within an intermediate neutral range; a reversing shaft coupled to the admission combining mechanism; an independently movable reversing shaft coupled to the exhaust combining mechanism; an engineman's control member coupled to one of said reversing shafts; and connections from said shaft to the other shaft incorporating means for altering the amplitude of the motion transmitted from one shaft to the other in both the forward and the reverse range and for inverting the relative angular positions of said shafts within said neutral range.

23. For locomotive engines and the like, a valve gear comprising separately adjustable and reversible combining mechanisms for actuating admission and exhaust valves, respectively, and adapted for variable motion relative to each other throughout a forward range of adjustment and a reverse range of adjustment, and for relative inversion of position within an intermediate neutral range; a reversing shaft coupled to the admission combining mechanism; an independently movable reversing shaft coupled to the exhaust combining mechanism; an engineman's control member coupled to one of said reversing shafts; and connections from said shaft to the other shaft incorporating means for altering the amplitude of the motion transmitted from one shaft to the other in both the forward and the reverse range and for inverting the relative angular positions of said shafts within said neutral range; and said engineman's control member having three corresponding ranges of movement.

24. For locomotive engines and the like, a valve gear comprising separately adjustable and reversible combining mechanisms for actuating admission and exhaust valves, respectively; a reversing shaft coupled to the admission combining mechanism; an independently movable reversing shaft coupled to the exhaust combining mechanism; an engineman's control member coupled to one of said reversing shafts; and connections from said shaft to the other shaft incorporating means for altering the amplitude of the motion transmitted from one shaft to the other so as to give one an angular lead over the other, including a lever having a shiftable fulcrum adapted to invert the relative angular lead of said shafts near the mid-point of the range of adjustment.

25. For locomotive engines and the like, a valve gear comprising separately adjustable and reversible combining mechanisms for actuating admission and exhaust valves, respectively; a reversing shaft coupled to the admission combining mechanism; an independently movable reversing shaft coupled to the exhaust combining mechanism; an engineman's control member coupled to one of said reversing shafts; connections from said shaft to the other shaft incorporating means for altering the amplitude of the motion transmitted from one shaft to the other including a lever having a shiftable fulcrum adapted to invert the relative angular positions of said shafts near the mid-point of their range of adjustment; and means controlled by said engineman's control member for so shifting said fulcrum.

26. For locomotive engines and the like, a valve gear comprising separately adjustable and reversible combining mechanisms for actuating admission and exhaust valves, respectively; a reversing shaft coupled to the admission combining mechanism; an independently movable reversing shaft coupled to the exhaust combining mechanism; an engineman's control member coupled to one of said reversing shafts; connections from said shaft to the other shaft incorporating means for altering the amplitude of the motion transmitted from one shaft to the other including a lever having a shiftable fulcrum adapted to invert the relative angular positions of said shafts near the mid-point of their range of adjustment; and fluid pressure actuated means controlled by said engineman's control member for so shifting said fulcrum.

27. For locomotive engines and the like, a valve gear comprising separately adjustable and reversible combining mechanisms for actuating admission and exhaust valves, respectively; a reversing shaft coupled to the admission combining mechanism; an independently movable reversing shaft coupled to the exhaust combining mechanism; an engineman's control member coupled to one of said reversing shafts; connections from said shaft to the other shaft incorporating means for altering the amplitude of the motion transmitted from one shaft to the other including a lever having a shiftable fulcrum adapted to invert the relative angular positions of said shafts near the mid-point of their range of adjustment; fluid pressure actuated means controlled by said engineman's control member for so shifting said fulcrum; and a device acting under the influence of failure of said fluid pressure, to lock both reverse shafts to move together.

28. For locomotive engines and the like, having right and left cylinders, relatively movable admission and exhaust valve devices for each cylinder, pistons reciprocable in said cylinders, and driven parts actuated by said pistons, a valve gear comprising: a pair of yoke members, each actuated by one of said driven parts, and thereby oscillated respectively in synchronism with the reciprocations of the right and left pistons; relatively movable admission and exhaust combining levers, one of each being coupled to each yoke members; a pair of swinging link mechanisms; a cross-over connection from one of said yoke members to one of said link mechanisms, adapted to drive said mechanism from said yoke member in like sense of oscillation; a second cross-over connection from the other yoke member to the second link mechanism, adapted to oscillate said link mechanism in a sense opposite to the oscillation of its driving yoke; a radius rod for each combining lever, coupled thereto and adjustably coupled to the link mechanism which is actuated by the opposite yoke; and reversible adjusting mechanism having connections adapted to position all the radius rods simultaneously adjacent like ends of said link mechanisms or alternatively simultaneously adjacent the other ends of said mechanisms.

29. For locomotive engines and the like, having right and left cylinders, relatively movable admission and exhaust valve devices for each cylinder, pistons reciprocable in said cylinders, and driven parts actuated by said pistons, a valve gear comprising: a pair of yoke members, each actuated by one of said driven parts, and thereby oscillated respectively in synchronism with the reciprocations of the right and left pistons; relatively movable admission and exhaust combining levers, one of each being coupled to each yoke member; a pair of swinging link mechanisms; a cross-over connection from one of said yoke members to one of said link mechanisms, adapted to drive said mechanism from said yoke member in like sense of oscillation; a second cross-over connection from the other yoke member to the second link mechanism, adapted to oscillate said link mechanism in a sense opposite to the oscillation of its driving yoke; a radius rod for each combining lever coupled thereto and adjustably coupled to the link mechanism which is actuated by the opposite yoke; and reversible adjusting mechanism having connections to said radius rods including means effecting differential adjustment of the admission radius rods in said link mechanisms as compared with the adjustment of the exhaust radius rods in said mechanisms.

30. For locomotive engines and the like, having right and left cylinders, relatively movable admission and exhaust valve devices for each cylinder, pistons reciprocable in said cylinders, and driven parts actuated by said pistons, a valve gear comprising: a pair of yoke members, each actuated by one of said driven parts, and thereby oscillated respectively in synchronism with the reciprocations of the right and left pistons; relatively movable admission and exhaust combining levers, one of each being coupled to each yoke member; a pair of swinging link mechanisms; a cross-over connection from one of said yoke members to one of said link mechanisms, adapted to drive said mechanism from said yoke member in like sense of oscillation; a second cross-over connection from the other yoke member to the second link mechanism, adapted to oscillate said link mechanism in a sense opposite to the oscillation of its driving yoke; a radius rod for each combining lever, coupled thereto and adjustably coupled to the link mechanism which is actuated by the opposite yoke; reversible adjusting mechanism having connections to said radius rods including means effecting differential adjustment of the admission radius rods in said link mechanisms as compared with the adjustment of the exhaust radius rods in said mechanisms; and means for locking the admission and exhaust radius rods together, whereby to eliminate their differential adjustment.

31. For locomotive engines and the like having a cylinder at each side, relatively movable admission and exhaust valves therefor, reciprocating pistons in said cylinders coupled to cranks arranged in quadrature, a valve gear comprising a pair of yokes in side-by-side relation, mounted for independent oscillation, and having actuating connections adapted to oscillate them in unison respectively with the two pistons; an admission combining lever and an exhaust combining lever pivotally mounted in each yoke with freedom for movement relative to each other; two pairs of links, mounted in side-by-side relation for independent oscillation of one pair relative to the other; cross-over connections for driving the right-hand links from the left-hand yoke and for driving the left-hand links from the right-hand yoke; a radius rod for each combining lever, pivotally coupled to the respective lever and slidably coupled to one of said links; and independent take-off connections from the right and left admission combining levers to actuate the admission valves for the two cylinders, and from the right and left exhaust combining levers to actuate the exhaust valves for the two cylinders.

32. For locomotive engines and the like having a cylinder at each side, relatively movable admission and exhaust valves therefor, reciprocating pistons in said cylinders coupled to cranks arranged in quadrature, a valve gear comprising a pair of yokes in side-by-side relation, mounted for independent oscillation, and having actuating connections adapted to oscillate them in unison respectively with the two pistons; an admission combining lever and an exhaust combining lever pivotally mounted in each yoke with freedom for movement relative to each other; two pairs of links, mounted in side-by-side relation for independent oscillation of one pair relative to the other; cross-over connections for driving the right-hand links from the left-hand yoke and for driving the left-hand links from the right-hand yoke; a radius rod for each combining lever, pivotally coupled to the respective lever and slidably coupled to one of said links; independent take-off connections from the right and left admission combining levers to actuate the admission valves for the two cylinders, and from the right and left exhaust combining levers to actuate the exhaust valves for the two cylinders, one of said cross-over connections being coupled to drive its driven pair of links in like sense of oscillation with the yoke actuating the same, and the other cross-over connection being coupled to effect a reverse oscillation of its driven pair of links with relation to the oscillation of the actuating yoke; and adjusting and reversing mechanism coupled to the four radius rods to move all of them into like ends of their links simultaneously.

33. For locomotive engines and the like having a cylinder at each side, relatively movable admission and exhaust valves therefor, reciprocating pistons in said cylinders coupled to cranks arranged in quadrature, a valve gear comprising a pair of yokes in side-by-side relation, mounted for independent oscillation, and having actuating connections adapted to oscillate them in unison respectively with the two pistons; an admission combining lever and an exhaust combining lever pivotally mounted in each yoke with freedom for movement relative to each other; two pairs of links, mounted in side-by-side relation for independent oscillation of one pair relative to the other; cross-over connections for driving the right-hand links from the left-hand yoke and for driving the left-hand links from the right-hand yoke; a radius rod for each combining lever, pivotally coupled to the respective lever and slidably coupled to one of said links, independent take-off connections from the right and left admission combining levers to actuate the admission valves for the two cylinders, and from the right and left exhaust combining levers to actuate the exhaust valves for the two cylinders, one of said cross-over connections being coupled to drive its driven pair of links in like sense of oscillation with the yoke actuating the same, and the other cross-over connection being coupled to effect a reverse oscillation of its driven pair of links with relation to the oscillation of the actuating yoke; adjusting and reversing mechanism coupled to the four radius rods to move all of them into like ends of their links simultaneously; and means in the adjusting connections to said radius rods for effecting a differential rate of travel of the admission and exhaust rods from the ends of their links toward the centers of oscillation thereof, whereby to prevent excessively early release and compression events at early cut-off adjustments.

34. In a locomotive engine having a cylinder with piston therein, admission valve means and exhaust valve means, adjustable mechanisms for varying and reversing the timing of said two valve means, respectively, with relation to piston movements, and positively-acting coordinating apparatus operatively associated with both mechanisms and adaptable to effect, alternatively, a plurality of differing positive relationships of the adjustment rates of said mechanisms.

35. In a locomotive engine having a cylinder with piston therein, admission valve means and exhaust valve means, adjustable mechanisms for varying and reversing the timing of said two valve means, respectively, with relation to piston movements, and apparatus normally positively coordinating the adjustment rates of said mechanisms in one predetermined relationship but adapted to effect alternatively a positive coordination thereof in a different predetermined relationship, said mechanisms being for the most part enclosed in housing means, and a device giving an indication, exteriorly of said housing means, as to which relationship of adjustment rates is in effect.

36. In a locomotive having cylinders, steam distributing valves therefor, reciprocating pistons, and crossheads and other driven parts actuated by said pistons, a valve controlling system comprising valve motion mechanism actuated by such driven parts for timing the valves with relation to the reciprocation of the pistons, and means for adjusting the valve gear including fluid pressure controlled devices for effecting differential variations in the timing of the admission and exhaust valve events in forward and reverse operation.

37. In a locomotive having cylinders, steam distributing valves therefor, reciprocating pistons, and crossheads and other driven parts actuated by said pistons, a valve controlling system comprising valve motion mechanism actuated by such driven parts for timing the valves with relation to the reciprocation of the pistons, means for adjusting the valve gear including fluid pressure controlled devices for effecting differential variations in the timing of the admission and exhaust valve events in forward and reverse operation, and means acting upon failure of said fluid pressure to effect unified adjustment of the admission and exhaust events.

38. In a locomotive having cylinders, steam distributing valves therefor, reciprocating pistons, and crossheads and other driven parts actuated by said pistons, a valve controlling system comprising valve motion mechanism actuated by such driven parts for timing the valves with relation to the reciprocation of the pistons, means for adjusting the valve gear including fluid pressure controlled devices for effecting differential variations in the timing of the admission and exhaust valve events in forward and reverse operation, fluid pressure actuated means for opening the valves at both ends of the cylinders at an intermediate point in the range of valve gear adjustment, and a compressed air supply system common to both said fluid pressure means.

39. In a locomotive having cylinders, steam distributing valves therefor, reciprocating pistons, and crossheads and other driven parts actuated by said pistons, a valve controlling system comprising valve motion mechanism actuated by such driven parts for timing the valves with relation to the reciprocation of the pistons, means for adjusting the valve gear including fluid pressure controlled devices for effecting differential variations in the timing of the admission and exhaust valve events in forward and reverse operation, fluid pressure actuated means for opening valves at both ends of the cylinders at an intermediate point in the range of valve gear adjustment, a compressed air supply system common to both said fluid pressure means, and means acting upon failure of said fluid pressure to effect unified adjustment of the admission and exhaust events.

40. In a locomotive having cylinders with pistons therein actuable by fluid under pressure, a controlling organ operative at will to affect delivery of fluid to the cylinders, valve means associated with the cylinders and adapted to be opened to facilitate drifting of the locomotive, and means for positively holding said valve means in open position automatically under a given setting of said controlling organ.

41. In a locomotive, having cylinders, valves, valve gear and engineman's control means for adjusting and reversing the operation of said valves through said valve gear, means associated with the cylinders operative to facilitate drifting of the locomotive, and means positively inter-relating operations of the control means and drifting means.

42. In a locomotive, having cylinders, valves, valve gear and engineman's control means for adjusting and reversing the operation of said valves through said valve gear, means associated with the cylinders operative to facilitate drifting of the locomotive, and means positively inter-relating operations of the control means and drifting means including means normally acting to insure non-functioning of the drifting means when the valve gear has been adjusted by said control means into other than a limited middle portion of its adjustment range.

43. In a locomotive having cylinders, valves, adjustable valve gear for actuating the valves, an engineman's control member for adjusting and reversing the valve gear and valves, means associated with the cylinders operative to facilitate drifting of the locomotive, and mechanism for actuating the last named means under the influence of said control member.

44. In a locomotive having cylinders, valves, adjustable valve gear for actuating the valves, an engineman's control member for adjusting and reversing the valve gear and valves, means associated with the cylinders operative to facilitate drifting of the locomotive, and mechanism for actuating the last named means under the influence of adjustment of the valve gear by said control member to a position intermediate the normal forward and reverse ranges of adjustment.

45. In a locomotive having cylinders, valves, valve gear for actuating said valves, adjustable throughout a forward range, a reverse range, and an extended neutral range, an engineman's control member for adjusting and reversing the valve gear and valves, and mechanism acting under the influence of said control member to establish communication between the two ends of each cylinder when the valve gear is in said neutral range of adjustment.

46. In a locomotive, having cylinders, valves, valve gear and an engineman's control member for adjusting and reversing the valve gear and valves, means associated with the cylinders operative to facilitate drifting of the locomotive, and fluid pressure operated mechanism operatively associated with said control member for actuating said means under the influence of said member.

47. In a locomotive having cylinders, valves, valve gear for actuating said valves, adjustable throughout a forward range, a reverse range, and an extended neutral range, an engineman's control member for adjusting and reversing the valve gear and valves, and fluid pressure operated mechanism actuable under the influence of adjustment of said valve gear into said neutral range to open valves at each end of both cylinders.

WILLIAM E. WOODARD.